(12) United States Patent
Barbour et al.

(10) Patent No.: US 12,032,278 B2
(45) Date of Patent: Jul. 9, 2024

(54) INTEGRATED SPATIAL PHASE IMAGING

(71) Applicant: Photon-X, Inc., Kissimmee, FL (US)

(72) Inventors: Blair Barbour, Windemere, FL (US);
Nicholas Englert, Orlando, FL (US);
Randy Kenneth Chamberlin, Madison, AL (US); David Theodore Truch, Katy, TX (US)

(73) Assignee: Photon-X, Inc., Kissimmee, FL (US)

( * ) Notice: Subject to any disclaimer, the term of this patent is extended or adjusted under 35 U.S.C. 154(b) by 0 days.

(21) Appl. No.: 17/395,627

(22) Filed: Aug. 6, 2021

(65) Prior Publication Data
US 2022/0103797 A1 Mar. 31, 2022

Related U.S. Application Data

(63) Continuation of application No. PCT/US2020/017254, filed on Feb. 7, 2020.
(Continued)

(51) Int. Cl.
*H04N 13/257* (2018.01)
*G03B 35/08* (2021.01)
(Continued)

(52) U.S. Cl.
CPC .............. *G03B 35/08* (2013.01); *G06V 10/10* (2022.01); *H04N 13/122* (2018.05);
(Continued)

(58) Field of Classification Search
CPC .... H04N 13/122; H04N 13/25; H04N 13/257; H04N 13/275
(Continued)

(56) References Cited

U.S. PATENT DOCUMENTS

| 5,631,970 A | * | 5/1997 | Hsu | G06V 20/13 |
| | | | | 382/113 |
| 5,890,095 A | * | 3/1999 | Barbour | G02B 26/06 |
| | | | | 702/106 |

(Continued)

FOREIGN PATENT DOCUMENTS

| JP | 2008002949 | 1/2008 |
| KR | 20000005409 | 1/2000 |

(Continued)

OTHER PUBLICATIONS

WIPO, International Search Report and Written Opinion mailed Jun. 15, 2020, in PCT/US2020/017254, 12 pgs.

*Primary Examiner* — Tung T Vo
(74) *Attorney, Agent, or Firm* — Henry Patent Law Firm PLLC

(57) ABSTRACT

In a general aspect, integrated spatial phase imaging is described. In some aspects, an integrated imaging system includes a sensor device and one or more processors. The sensor device is configured to generate a first set of data indicative of a first set of attributes of an object and a second set of data indicative of a second set of attributes of the object. The one or more processors are configured to: generate a first set of primitives based on the first set of data; generate a second set of primitives based on the second set of data; generate a combined data set based on the first set of primitives and the second set of primitives; and determine a plurality of features of the object based on the combined data set.

26 Claims, 16 Drawing Sheets

Related U.S. Application Data

(60) Provisional application No. 62/802,840, filed on Feb. 8, 2019.

(51) Int. Cl.
 *G06V 10/10* (2022.01)
 *H04N 13/122* (2018.01)
 *H04N 13/25* (2018.01)
 *H04N 13/275* (2018.01)

(52) U.S. Cl.
 CPC .......... *H04N 13/25* (2018.05); *H04N 13/257* (2018.05); *H04N 13/275* (2018.05)

(58) Field of Classification Search
 USPC .......................................................... 348/46
 See application file for complete search history.

(56) References Cited

U.S. PATENT DOCUMENTS

| | | | |
|---|---|---|---|
| 6,163,365 A | 12/2000 | Takahashi | |
| 6,671,390 B1 | 12/2003 | Barbour et al. | |
| 6,741,744 B1* | 5/2004 | Hsu | G06K 9/6292 |
| | | | 382/229 |
| 6,810,141 B2 | 10/2004 | Barbour | |
| 8,023,724 B2 | 9/2011 | Barbour | |
| 8,320,661 B2 | 11/2012 | Barbour | |
| 8,736,670 B2 | 5/2014 | Barbour et al. | |
| 9,693,728 B2 | 7/2017 | Harry et al. | |
| 9,736,670 B2 | 7/2017 | Harry et al. | |
| 2002/0181761 A1 | 12/2002 | Barbour | |
| 2003/0103674 A1 | 6/2003 | Publicover | |
| 2005/0163365 A1 | 7/2005 | Barbour | |
| 2007/0046525 A1 | 3/2007 | Holbrook et al. | |
| 2011/0037965 A1* | 2/2011 | Hintz | G06V 10/255 |
| | | | 356/4.01 |
| 2011/0134220 A1 | 6/2011 | Barbour et al. | |
| 2014/0211193 A1 | 7/2014 | Bloom et al. | |
| 2015/0350569 A1* | 12/2015 | Espersen | G03B 17/17 |
| | | | 348/164 |
| 2016/0292908 A1 | 10/2016 | Obert | |
| 2017/0006233 A1* | 1/2017 | Venkataraman | H01L 27/14687 |
| 2017/0091897 A1 | 3/2017 | Lee et al. | |
| 2017/0098310 A1 | 4/2017 | Chefd'Hotel et al. | |
| 2017/0345222 A1 | 11/2017 | Cohen-Or et al. | |
| 2019/0178968 A1 | 6/2019 | Cetingul | |
| 2019/0213739 A1* | 7/2019 | Ohba | G06V 10/44 |
| 2019/0258878 A1 | 8/2019 | Koivisto et al. | |
| 2020/0054398 A1* | 2/2020 | Kovtun | G16H 40/63 |
| 2020/0138521 A1* | 5/2020 | Aben | A61B 6/4417 |
| 2020/0175715 A1* | 6/2020 | Ogasawara | G06T 7/73 |
| 2020/0231176 A1* | 7/2020 | Motoyama | B60W 60/001 |
| 2020/0272834 A1* | 8/2020 | Motoyama | G06K 9/6289 |

FOREIGN PATENT DOCUMENTS

| | | |
|---|---|---|
| KR | 20150069617 | 6/2015 |
| WO | 1997037336 | 10/1997 |
| WO | 2012053811 | 4/2012 |
| WO | 2018213841 | 11/2018 |
| WO | 2020163742 | 8/2020 |
| WO | 2020236575 | 11/2020 |
| WO | 2021030454 | 2/2021 |
| WO | 2021067665 | 4/2021 |

\* cited by examiner

| Algorithm Name | Description | Input |
|---|---|---|
| Standard Polarimetric Surface Normals Reconstruction | • Constructs 3D surface normals from polarization Imagery.<br>• Includes equations for specular reflectivities and diffuse reflectivity.<br>• Makes assumptions regarding lighting parameters<br>• Reconstruction is highly sensitive to lighting and scanned material properties<br>• Works best with omnidirectional lighting. | SPI Sensor<br>• Polarity<br>• Coordinate intensity<br>• RGB intensity |
| Look-up Table Polarimetric Surface Normals Reconstruction | • Maps surface normals of a sphere to an object of an unknown shape<br>• Alternate method to model a surface with reduced dependence on lighting parameters<br>• Sphere must be same material and in same lighting conditions as shape<br>• Produces better surfaces in non-uniform lighting but may produce less smooth surface | • SPI Sensor-sphere<br>• SPI Sensor-unknown shape |
| 3D Reconstruction from 3+ Strobed Light Sources | • Reconstructs 3D surface using lights firing in sequence<br>• Camera captures scene under illumination from each light source<br>• Light Locations relative to camera location must be known | • SPI Sensor-1x under each light source<br>• Light source locations |
| Hemisphere Disambiguation | • Multiple Algorithms for determining upper or lower hemisphere label for normal value<br>• Methods include reference surface, smoothness constraints, sign of theta constraints<br>• Grows unknown based on manually verified values<br>• Further development needed for new objects | Normals + optional list of known hemispheres |
| Polarimetric Calibration | • Various routines to extract more accurate polarization info from a polarimeter<br>• Includes dark frame/flat field cal, Meuller cal, lens undistortion, pixel correction, polarimetric calibration chart correction<br>• Defines parameters for sensor | • SPI Data<br>• Manual calibration Values |
| Polarimetric Confidence Quantification | • Several algorithms to measure scene parameters<br>• Experimental and does not consider non-uniform light<br>• Assignes 0-1 value - 0 is highest confidence | • SPI Data |

FIG. 8A

| Output | 1st Level Primitive | 2nd Level Primitive | ShapeOS Level | Category |
|---|---|---|---|---|
| • Surface Normal values per pixel | • This algorithm determines Surface normals<br>• Passed to other routines<br>• May be stored as floating point TIFF (XYZ values instead of RGB values in TIFF) | | | 1. Normals Calculation |
| • Normals values-sphere interpolated<br>• Normals values-as captured | • This algorithm determines Surface normals<br>• Passed to other routines<br>• May be stored as floating point TIFF | | | 1. Normals Calculation |
| Normals values | • This algorithm determines Surface normals<br>• Passed to other routines<br>• May be stored as floating point TIFF | | | 1. Normals Calculation |
| Corrected/verified (or estimated) normal values | • Improves Normals data by determining +/- hemisphere orientation | | | 2. Supporting |
| Parameters for Images Capture | • Used to calculate scene parameters<br>• Uses scene parameters for capture | | | 2. Supporting |
| Floating point number between 0 and 1-0 is right, 1 is not right | Assignes value to normals based on confidence | | | 2. Supporting |

FIG. 8A (Cont.)

| Algorithm Name | Description | Input |
|---|---|---|
| Normals to 3D Surface (many algorithms) | • Takes standard surface normals from a camera viewpoint and reconstructs 3D surfaces.<br>• Works well if occlusions are known, normals are accurate, and normals map to correct range of angles<br>• One of these algorithms works best-called "Compressed Iterative Feedback" | • SPI Sensor |
| Surface Reconstructions Warped with Verticles from Another Scan Modality | • Extracts low-frequency 3D scene reconstruction data from other sensor (like RealSense)<br>• Overlays high-frequency 3d data from SPI on low frequency 3D structure<br>• Works well up to about 4' from target<br>• Potentially supports varity of 3D input | • SPI Sensor<br>• Structured Light Sensor<br>• Potential for Other 3D depth sensors |
| Compressed 3D File Storage | • File format capable of storing single camera 3D<br>• File size is much smaller than OBJ<br>• Cannot store mesh, point cloud or stitched (Ply and OBI would be used for stitched surface) | • 3D Reconstruction from normals |
| Polarimetric Bar Code Tracking | • Ability to Construct tags encoding Unique sequence of polarization orientations used to Identify<br>• Application works but opportunities exist for various improvements | • Identification Information<br>• SPI Data |
| SPI Face Modeling | • Stand-alone application produces 3D of human face from a single scan<br>• Development complete but issues remain with overall accuracy - especially nose | • SPI Sensor |
| Surface Profile Measurement | • Application developed for BP that measure surface profile of pipes and plats for coating maintenance<br>• Accuracy down to micron level-custom solution<br>• Under active development - complete in 2019 | • SPI Sensor<br>• Structured Light Sensor |
| Biometrics | • Various applications to perform biometric ID includes fingerprints, facial recognition, iris recognition<br>• Apps vendor-specific - can be modified for new solution | • SPI Sensor |

FIG. 8B

| Output | 1st Level Primitive | 2nd Level Primitive | ShapeOS Level | Category |
|---|---|---|---|---|
| • 3D reconstruction<br>• Data related to reconstruction | | These algorithms take surface normals and create 3D model | | 3. 3D Reconstruction |
| 3D reconstruction<br>Data related to reconstruction | Creates low-res surface from non-SPi sensor | Overlays 3D reconstruction form normals onto low-res 3D | | 3. 3D Reconstruction |
| Compressed file which may be used to recreate 3D model | | Storage for rendered 3D surfaces from single camera - not stitched | | 4. Storage |
| • Unique polarization sequence<br>• Reading of unique sequence<br>• Identification from sequence | | Measures polarity sequence | • Creates/stores unique polarity sequence<br>• Performs Identification | 5. Specific Application |
| 3D model of face, masked to include only face | Measures and determines normal values | Creates 3D face model | | 5. Specific Application |
| • 3D reconstruction<br>• Surface profile Measurement | | Overlays 3D reconstruction from normals onto low-res 3D | Provides surface profile measurements for defined area | 5. Specific Application |
| 3D of biometric target<br>Identification | | Creates 3D reconstruction of biometric area of interest | • Stores reference reconstruction for identification<br>• Compares capture to reference and unlocks if matched | 5. Specific Application |

FIG. 8B (Cont.)

INTEGRATED SPATIAL PHASE IMAGING

CROSS-REFERENCE TO RELATED APPLICATIONS

The present application is a continuation of PCT Application No. PCT/US2020/017254, filed Feb. 7, 2020, which claims priority to U.S. Provisional Patent Application Ser. No. 62/802,840, filed Feb. 8, 2019, entitled "Spatial Phase Imaging Integration Intelligence." The contents of each of the above-referenced priority applications are hereby incorporated by reference in their entirety.

BACKGROUND

The following description relates to integrated spatial phase imaging.

Conventional imaging systems employ intensity-based techniques to detect electromagnetic energy proceeding from a source (e.g., an object). As one example of a conventional system, a spectroscopic system determines spectral (wavelength) composition of objects and scenes. Conventional imaging systems may not be suitable to generate 3D images or other angle representations of object shapes and scenes in real-time. Furthermore, conventional imaging systems may not be suitable in incoherent electromagnetic environments or turbid media (e.g., environments containing mist, fog, or smoke). Other imaging solutions may be needed to overcome the limited use of conventional imaging systems.

DESCRIPTION OF DRAWINGS

FIGS. 8A and 8B shows example methods for creating surfaces and shapes of an object.

DETAILED DESCRIPTION

Figure 1A:
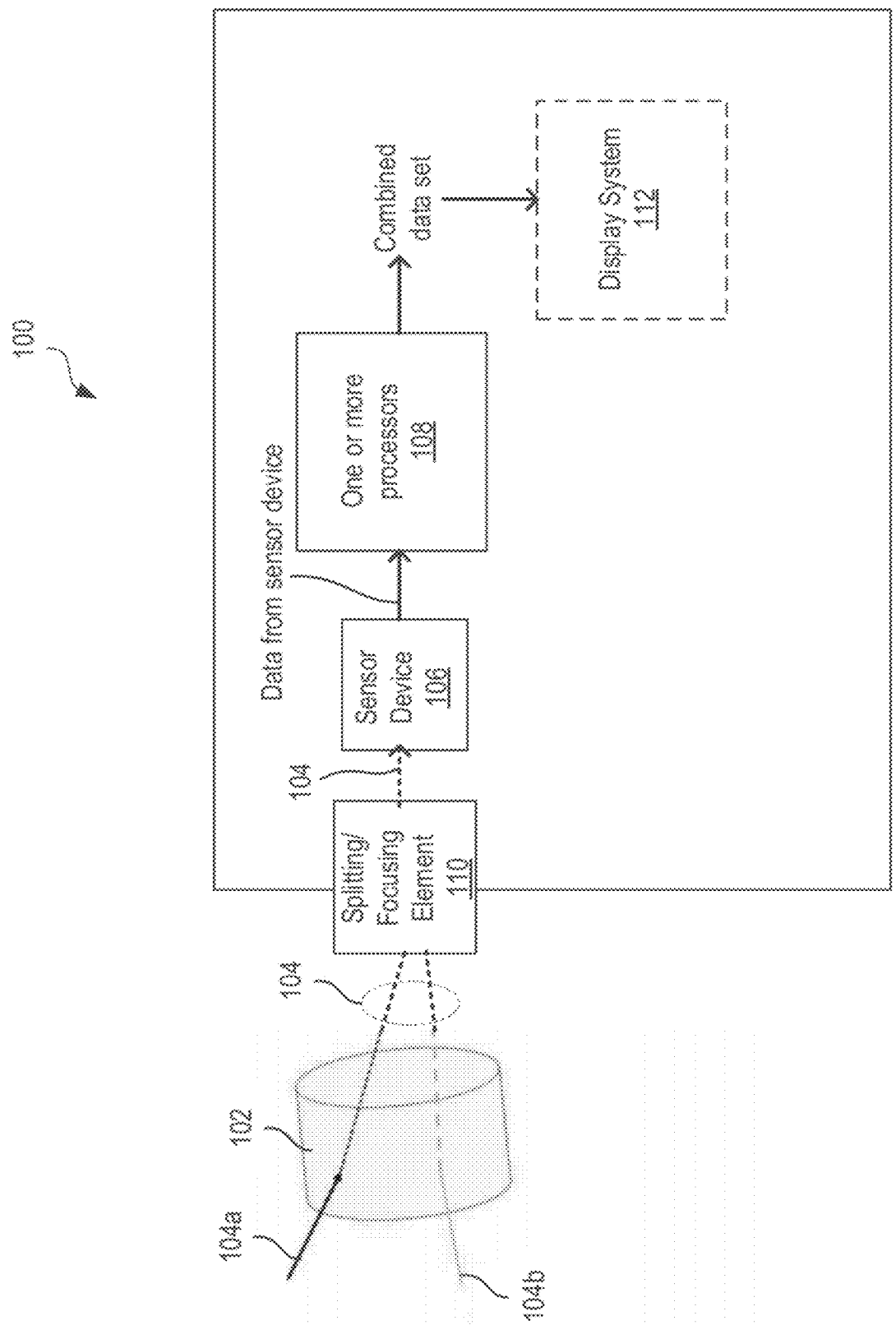
FIG. 1A shows an example integrated imaging system including a sensor device.

In some aspects of what is described here, an integrated imaging system includes a sensor device. In some implementations, the sensor device may be a single spatial phase imaging (SPI) sensor. In other implementations, the sensor device may be a plurality of sensors, for example a combination of an SPI sensor and one or more second sensors. The SPI sensor may be a sensor that generates data (e.g., spatial phase data) indicative of an orientation or angle of electromagnetic (EM) radiation emitted by, reflected off, or transmitted through various features of an object (including a scene) located in a field-of-view (FOV) of the integrated imaging system. The SPI sensor is sensitive to both the magnetic vector of the EM radiation as well as the electric vector of the EM radiation. Consequently, the integrated imaging system can derive information about the features of the object from the magnetic vector as well as the electric vector of the EM radiation. Such features may include surfaces, gradients, or interior volume features of the object. Furthermore, the EM radiation received by the integrated imaging system may be incoherent illumination, active or passive illumination, or may occur in any band of the EM spectrum. In implementations where the sensor device is a combination of the SPI sensor and one or more second sensors, the second sensor may be a sensor that generates data indicative of cues or aspects of the object that are different or same from the data generated by the SPI sensor. As an example, instead of generating data indicative of the orientation of EM radiation, the second sensor may operate based on a modality that is different from the SPI sensor or may generate data indicative of the depth of the various features of the object. Examples of the second sensor include Kinect sensors, light detection and ranging (LiDAR) sensors, infrared sensors, spectral sensors, X-Ray sensors, laser scanners, monochrome and color sensors, shape from motion, stereo, depth sensors, sonar sensors, radar sensors, time-of-flight (ToF) sensors, plenoptic (lightfield) sensors, acoustic or stereo sensors, structured light sensors, rangefinders, or focus sensors, near infrared (NIR) sensors, short wavelength infrared (SWIR) sensors, medium wavelength infrared (MWIR) sensors, long wavelength infrared (LWIR) sensors, to name a few. The SPI sensor is a self-calibrated sensor. The second sensor can be calibrated to at least one other sensor (e.g., the SPI sensor) such that the sensors are directed to the same object. The data from the SPI sensor (e.g., spatial phase data) is processed (e.g., by one or more processors of the integrated imaging system) to generate a first set of primitives, which includes its respective first- and second-level primitives. Additional attributes could also be associated to the pixel correspondence. A first-level primitive (also referred to as a first-order primitive) may be associated with primary physics data such as degree of linear polarization (DOLP), wavelength, intensity, etc., while a second-level primitive (also referred to as a second-order primitive) may be values derived from the first-level primitives. Examples of second-level primitives include speed or acceleration, etc. The first- and second-level primitives may be based on the electric field of the EM radiation, the magnetic field of the EM radiation, or a combination thereof. In implementations where the sensor device may be a plurality of sensors, for example a combination of an SPI sensor and one or more second sensors, data from the second sensor is processed (e.g., by one or more processors of the integrated imaging system) to generate a second set of primitives, which may include its own first- and/or second-level primitives. The first set of primitives and the second set of primitives are subsequently combined to generate a combined data set that is a dense, high-resolution, accurate, and information-rich representation of the various features of the object located within the FOV of the integrated imaging system including but not limited to the 3D angle of each pixel in the sensor array. Since the combined data set is an information-rich representation of the various features of the object, a myriad of features may be elicited from the combined data set—a capability not currently possible with conventional imaging systems. Examples of the information-rich representation include, but are not limited to, a three-dimensional (3D) model or image of the object, a frequency distribution of the EM radiation emanating from the object, angles of various surfaces of the object, surface normal vectors associated with various surfaces of the object, an identification of material(s) of the object (e.g., dielectric constants), to name a few. In many cases, this feature rich set of usable information can be provided in real time (near time), which provides the ability to have a dynamic digital twin in existence, which in turn is useful for many applications, examples being leading edge information for autonomous applications, tracking of objects in motion such as drones, stress and strain movements of structures. In some examples discussed herein, the combined data set may also be evaluated to enhance artificial intelligence (AI) and other 3D functions. Artificial Intelligence (AI) has been limited to 2D data sets and manual training with mostly manual annotation in each image, a very long and tedious process. With each pixel now with a SPI sensor "seeing" the angle of the surface and being able to cluster similar pixels into panels and velocity and rates of change in the change in the surface one can "see" a high resolution complete surface with embedded analytics which can enhance an AI algorithm to better identify the object in 3D we can also autonomously train the algorithm in a computer on synthetic data sets to allow for very fast autonomous training on all 3D data sets for real world objects. The AI algorithms can also be able to breakdown the object or scene into separable features, such as direction of light, specular/diffuse, material, etc. The examples discussed here result in both real-time metrology and real-time analysis of surface, gradient, and interior volume features for digitizing the real-world surfaces. In aspects where the EM radiation is in a high energy regime (e.g., gamma rays), the integrated imaging system may be able to provide information on the composition of the material of the object as well as information on the interior structures and features of the material itself.

Systems and techniques described here provide technical improvements and advantages over existing approaches. An advantage of the proposed integrated imaging system is that it provides spatial phase data having a high dynamic range since noise in the EM radiation arriving at the SPI sensor is substantially reduced. All scattered radiation is removed from the data before it enters the optical sensor, thus only direct energy from the object that represents the object surface makes it to the SPI sensor, thus the true signal from the object is read and not the other optical noise. Such noise in the EM radiation may, as an example, be generated when the EM radiation is emitted by, reflected off, or transmitted through various features (e.g., diffuse features) of the object. As another example, such noise in the EM radiation may be generated by disperse media (e.g., mist, fog, smoke, or other obscurants) located in the environment between the SPI sensor and the object. Another advantage of the proposed integrated imaging system is that it can operate at any distance with various lens combinations and for any type of EM radiation (e.g., incoherent illumination, active or passive illumination, or any band of the EM spectrum). Additionally, in some implementations, the proposed integrated imaging system generates spatial phase data and the data from the at least one other sensor at the same time. Since the spatial phase data and the data from the at least one other sensor are generated at the same time, this allows for real-time processing and combining of such data to generate, also in real-time, the above-described combined data set (a dense, high-resolution, accurate, and information-rich representation of the various 3D surface shapes features of the object). A further advantage of the proposed integrated imaging system is that it is upward and downward compatible with any currently available imaging modality and can be developed out of full imaging wafers. Current imaging sensor are typical 2D imagers, which are limited to a large lens, a CMOS image sensor and a computer processor; however, the proposed integrated imaging system can be developed out of complete stacked wafers across the EM spectrum. The proposed integrated imaging system can have a SPI image array wafer with thousands of imagers on the wafer, a second set of optical wafer for example can be stacked on top of the wafer and aligned using the fabrication process to create a lensless imaging wafer, and the backside illuminated carrier wafer can be a wafer of processors that match up to the imaging sensors to give complete and true edge processing as part of the wafer stack. An additional wafer can be included to control the imaging wafer communications channels. The typical imaging wafers today are cut into single image sensors, whereas the proposed SPI sensors can keep them all together with various lens combinations to create a whole 3D volumetric coverage with superhuman imaging capabilities. One could also form these imagers to any shape as well as cut them into any size. Yet another advantage of the proposed integrated imaging system is that AI, 3D and other analytics may be easily applied to the combined data set or any one of the first or second sets of primitives, thus allowing the integrated imaging system to be applied to a wide range of applications.

FIG. 1A shows an example of an integrated imaging system 100. In a general aspect, the integrated imaging system 100 generates a combined data set that is a dense, high-resolution, accurate, and information-rich representation of a scene or an object located within the FOV of the integrated imaging system 100. In some examples, the integrated imaging system 100 may even display the combined data set on a display system (e.g., as a 3D model or image, although this is merely one example of representing the information-rich combined data set). The combined data set is generated by the integrated imaging system 100 by combining different imaging modalities, cues, or aspects. For example, the integrated imaging system 100 may integrate the operation of a spatial phase imaging (SPI) sensor alone or in combination with at least one other different type of sensor, this could also be integrated on a wafer as a plurality of sensors with SPI alone or in combination with other sensor modalities to create a rich set of features to be ingested by the analytics. Examples of the one or more other different type of sensors include Kinect sensors, LiDAR sensors, infrared sensors, spectral sensors, X-Ray sensors, laser scanners, monochrome and color sensors, shape from motion, stereo, depth sensors, sonar sensors, radar sensors, ToF sensors, plenoptic (lightfield) sensors, acoustic or stereo sensors, structured light sensors, rangefinders, focus sensors, NIR sensors, SWIR sensors, MWIR sensors, LWIR sensors, to name a few. The SPI sensor may be configured to generate spatial phase data (e.g., indicative of an orientation (e.g., polarization) of EM radiation). By utilizing the SPI sensor alone (e.g., in the example shown in FIG. 1B) or with a plurality of other different type of sensor(s) (e.g., in the example shown in FIG. 1C), the integrated imaging system 100 captures various different physical properties, cues, or aspects, thus enabling the generation of the combined data set that is the dense, high-resolution, accurate, and information-rich representation of a scene or an object located within the FOV of the integrated imaging system 100.

In some implementations, the various sensors of the integrated imaging system 100 may be calibrated with each other to determine intrinsic and extrinsic parameters along with the relative pose between the different sensors. The SPI sensor can self calibrate to objects in the FOV; the SPI sensor measures the angle of the surface of each pixel and can register each pixel, and each segmented cluster and/or object can be used to self align each frame and each sensor or plurality of sensors to the world volumetric coordinate system. After calibration, EM radiation is captured from the FOV of the integrated imaging system 100 (e.g., using all the sensors at the same time) and sent to a computer (e.g. one or more processors of the integrated imaging system 100) for further processing. Additionally, a time-series analysis of the combined data set over different instances of time may be performed, e.g., to generate dynamic surface analytics that are indicative of, for example, surface flow, velocity, acceleration, stress and strain on a surface, etc. The dynamic surface analysis can be performed at the pixel level, the segmented clusters, velocity or rate of change of the surface, the object level or the scene level.

As discussed above, the integrated imaging system 100 generates a combined data set that is a dense, high-resolution, accurate, and information-rich representation of a scene or an object located within the FOV of the integrated imaging system 100. As an example, the integrated imaging system 100 may be used to generate a representation of an object 102 that is located within the FOV of the integrated imaging system 100. The representation of the object 102 may be a localization (e.g., 3D localization) of the object 102. Additionally or alternatively, the representation of the object 102 may be identification, characterization, or quantification of surfaces, shapes, or interrelationships among the shapes of the object 102. In some implementations, the integrated imaging system 100 may be configured to generate the combined data set in real time (e.g., in a range from one millisecond to about 5 seconds) through a plurality of image frames similar to a 3D shape video. Each individual frame has rich data features including but not limited to 3D shape at pixel or object level. The object 102 may be any physical object in the real world, some examples being buildings, structures, a human body, scenes, terrains, astronomical bodies, planetary bodies, vehicles, among others.

The integrated imaging system 100 may be sensitive to EM radiation 104 that is incident upon it. The EM radiation 104 encompasses any and all wave energy in the spectrum of EM energy. Examples of EM energy that the integrated imaging system 100 is sensitive to include the visible light range, the infrared range, the ultraviolet range, the microwave range, the x-ray range, the gamma ray range, and the radio frequency range. For simplicity, the examples presented herein are discussed primarily with regard to the portion of the EM spectrum that is at or near the visible, infrared and/or ultraviolet ranges.

The EM radiation 104 may be emitted by the object 102, reflected off the object 102 and directed toward the integrated imaging system 100, transmitted through the object 102 and directed toward the integrated imaging system 100, or may be a combination thereof. In some implementations, the EM radiation 104 may include ambient EM energy (e.g., ambient light 104a) that is reflected off, or emitted from the surface of the object or transmitted through the object 102. Additionally or alternatively, the EM radiation 104 may include EM energy that is projected onto the object 102 by an EM energy source (e.g., projected light 104b) and reflected off, emitted from the surface of the object or transmitted through the object 102.

The integrated imaging system 100 includes a sensor device 106. The sensor device 106 includes a first sensor 106-1 (e.g. in the example shown in FIG. 1B) and in some cases could use a second sensor or plurality of second sensors 106-2 (e.g., in the example shown in FIG. 1C). The first sensor 106-1 may be the above-discussed SPI sensor that generates spatial phase data of the object 102. As discussed in further detail below, the spatial phase data may be processed to generate a first set of primitives (including a collection of first- and second-level primitives) that is indicative of various features of the object 102. The various features of the object 102 may be represented by a broad number of parameters, including surface normal vectors, a degree of linear polarization, surface/pixel geometry, a frequency distribution of the EM radiation emanating from the object 102, angles of various surfaces of the object, identification of material(s) of the object (e.g., dielectric constants), etc. The second sensor 106-2, on the other hand, may be a sensor that generates a different cue or aspect compared to the SPI sensor 106-1. For example, the second sensor 106-2 may be a sensor having a different modality compared to the SPI sensor 106-1. The second sensor 106-2 may include a Kinect sensor, a LiDAR sensor, infrared sensors, spectral sensors, X-Ray sensors, laser scanners, monochrome and color sensors, shape from motion, stereo, depth sensors, a sonar sensor, a radar sensor, a ToF sensor, a plenoptic (lightfield) sensor, an acoustic or stereo sensor, a structured light sensor, a rangefinder, a focus sensor, a NIR sensor, a SWIR sensor, a MWIR sensor, a LWIR sensor, or a combination thereof. In some implementations where the SPI sensor 106-1 is sensitive to a high energy regime of the EM spectrum, the second sensor(s) 106-2 may be omitted. In some examples, the second sensor 106-2 may even be another SPI sensor that produces a different or same cue or aspect compared to the SPI sensor 106-1. For example, in some implementations, while the spatial phase data from the SPI sensor 106-1 may be processed to generate the first set of primitives indicative of a 3D surface topography of the object 102, the data from the second sensor 106-2 (e.g., another SPI sensor) may be processed to generate a second set of primitives (also including a collection of first- and second-level primitives) indicative of a shape from motion or a specular/diffuse separation shape. As such, the first and second sensors 106-1, 106-2 allow the integrated imaging system 100 to use different modalities, cues, or aspects to generate the combined data set that is a dense, high-resolution, accurate, and information-rich representation of the object 102.

The integrated imaging system 100 also includes one or more processors 108 configured to process spatial phase data from the SPI sensor 106-1 and the data from the second sensor 106-2. Such processing of the spatial phase data from the SPI sensor 106-1 and the data from the second sensor 106-2 may generate the first and second sets of primitives that are subsequently used to generate the combined data set. In the example of FIG. 1A, EM radiation 104 from the object 102 is divided into the different sensors 106-1, 106-2 by a splitting element 110. In some implementations, the splitting element 110 may include a prism, a beam splitter, an element including metamaterials, or an element including birefringent materials. Additionally or alternatively, the splitting element 110 may be configured to focus or direct the EM radiation 104 onto the SPI sensor 106-1 or the second sensor 106-2 and may include one or more apertures, lenses, mirrors, catoptric elements, fiber optic elements, micromirror arrays, microlens arrays, baffles, holographic optical elements, diffractive optical elements, and beam steering mechanisms. For example, catoptric elements may be used to design a wide-angle splitting element 110. As another example, beam steering mechanisms may be used to expand a FOV of the SPI sensor 106-1 and the second sensor 106-2. As a further example, microlens arrays may be used to take advantage of numerical imaging phenomena including, but not limited to, super-resolution, greater depth of field, or greater dynamic range. The wafer array of imagers has pixel level microlens and/or wafer level image sensor wafer lenses sometimes referred to as a lensless imaging system. In these cases, and others, a splitting optic is not required.

In the example of FIG. 1A, the SPI sensor 106-1 and the second sensor 106-2 are integrated by positioning them side-by-side in or on the same device. As an example, the SPI sensor 106-1, the second sensor 106-2, and the one or more processors 108 may be located within an integrated housing of a single imaging device. However, the example shown in FIG. 1A is merely one illustration of how the SPI sensor 106-1 and the second sensor 106-2 may be integrated. In other examples of integration, the SPI sensor 106-1 and the second sensor 106-2 are integrated by building the sensors 106-1, 106-2 into a single integrated sensor by staggering different types of pixels in the same device (which may also include the one or more processors 108). In yet further examples, the SPI sensor 106-1 and the second sensor 106-2 may be included in separate devices that are directed to or focused on the same object 102. In such examples, the integrated imaging system 100 may be devoid of the splitting element 110. Furthermore, in such examples, the one or more processors 108 may be included in the device having the SPI sensor 106-1, the device having the second sensor 106-2 (if present), or may be located in another device (e.g., a cloud-based processor).

Figure 1B:
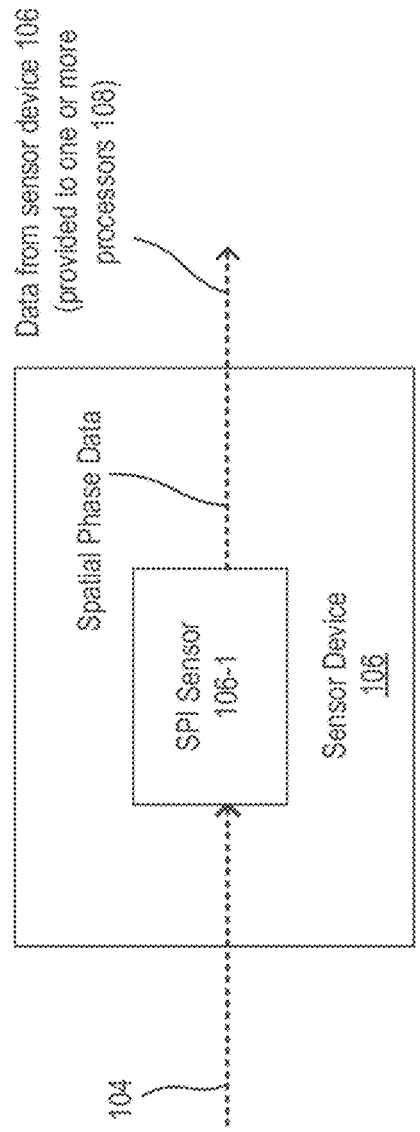
FIGS. 1B and 1C show examples of the sensor device of the integrated imaging system shown in FIG. 1A.
Figure 1C:
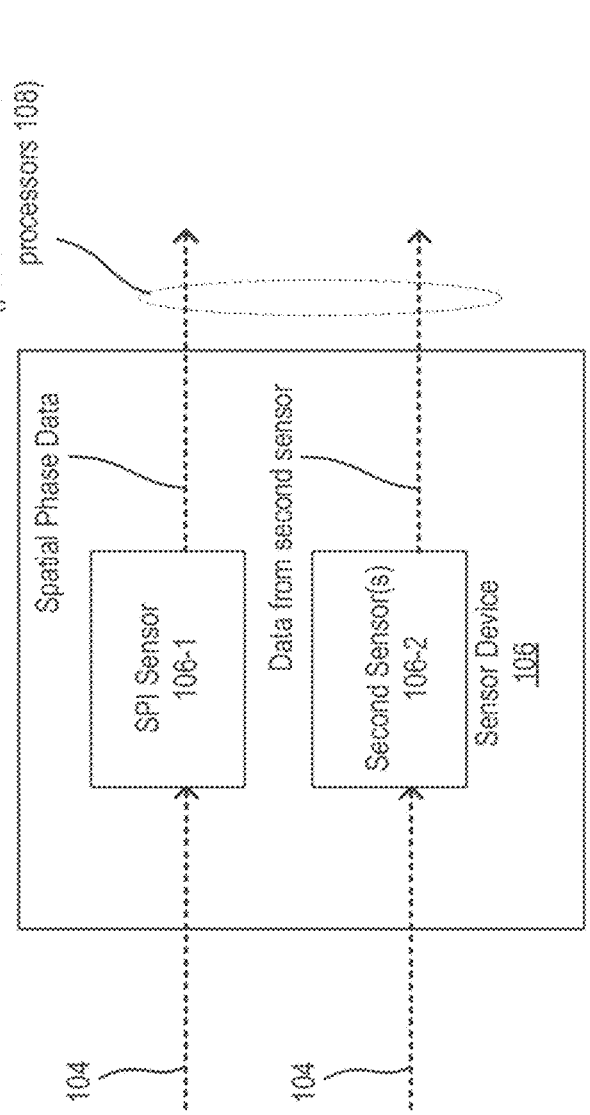
Figure 1D:
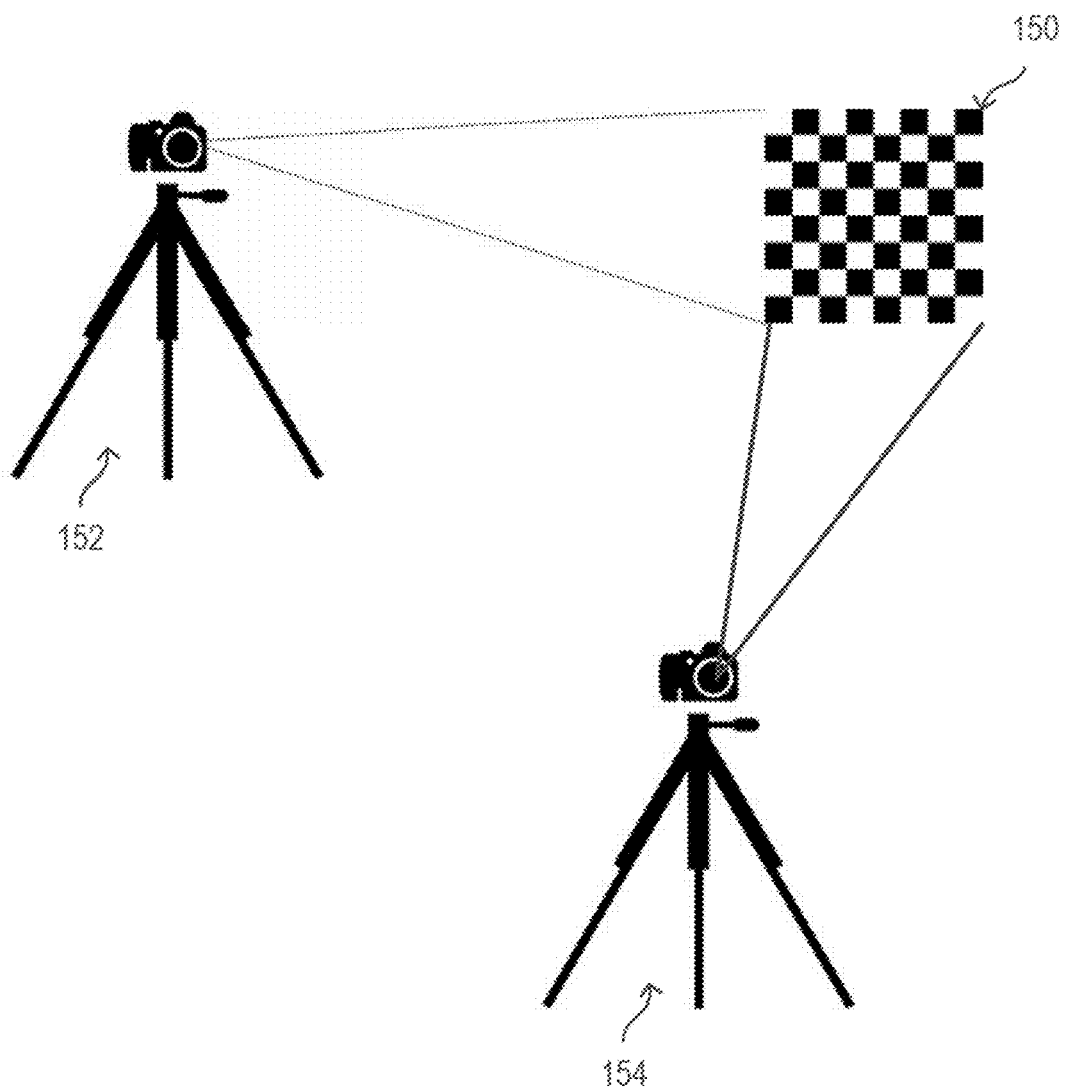
FIG. 1D shows an example setup used for stereo calibration.

In the above-described example where the SPI sensor 106-1 and the second sensor 106-2 (if present) are included in separate devices or in the example where the SPI sensor 106-1 and the second sensor 106-2 (if present) are positioned side-by-side in or on the same device, the SPI sensor 106-1 and the second sensor 106-2 may need to be calibrated to each other. One method of performing such a calibration includes stereo calibration. FIG. 1B shows an example setup used for stereo calibration where the SPI sensor 106-1 and the second sensor 106-2 are included in separate devices. The example setup shown in FIG. 1B includes a reference pattern 150, a first device 152 (e.g., the device including the SPI sensor 106-1), and a second device 154 (e.g., the device including the second sensor 106-2). The reference pattern 150 shown in FIG. 1B is a checkerboard pattern, although other substitute patterns may be used. An advantage of using a checkerboard pattern is that it is flat and thus there are no concerns of depth. Furthermore, it is easier to extract corner points from a checkerboard pattern as they are extensively defined with all corners of the checkerboard pattern lie on the same line.

The calibration of the SPI sensor 106-1 and the second sensor 106-2 determines the relative pose between them, thus allowing for accurate processing and combination of the spatial phase data from the SPI sensor 106-1 and the data from the second sensor 106-2 to generate the above-described combined data set. For example, calibration allows the first set of primitives computed from the spatial phase data to be accurately projected onto the second set of primitives computed from the data of the second sensor 106-2 (or vice versa). Different relative poses between the SPI sensor 106-1 and the second sensor 106-2 may be obtained to get a better calibration. The calibration only needs to be performed once, assuming the SPI sensor 106-1 and the second sensor 106-2 remain rigid with respect to each other and the focal length is not changed. This may, as an example, be accomplished using a pinhole camera model, where 3D points are projected into an image plane using a perspective transformation. Calibrating the SPI sensor 106-1 and the second sensor 106-2 to each other generates values which can be used to measure distances in length units and not in pixels.

The calibration of the SPI sensor 106-1 and the second sensor 106-2 to each other may be expressed as follows:

$$sm' = A[R \mid t]M'$$

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}$$

Where (X, Y, Z) are the coordinates of a 3D point in the real-world coordinate space; (u, v) are the coordinates of the projection point in pixels; A is a camera matrix, or a matrix of intrinsic parameters, include focal length, image format and principal point; [R/t] is a matrix of extrinsic parameters, which represents the coordinate transformation from 3D real-world to 3D camera model; (Cx, Cy) is a principal point that is usually at the image center; and (fx, fy) are the focal lengths expressed in pixel units. After the calibration, the first device 152 is kept fixed with respect to the second device 154. Then, the object 102 is exposed to both the first device 152 and the possible second device 154 at the same moment and the data collected may be sent directly to a software suite that had the ability to analyze the data collected and output the combined data set for a specific application.

Figure 2A:
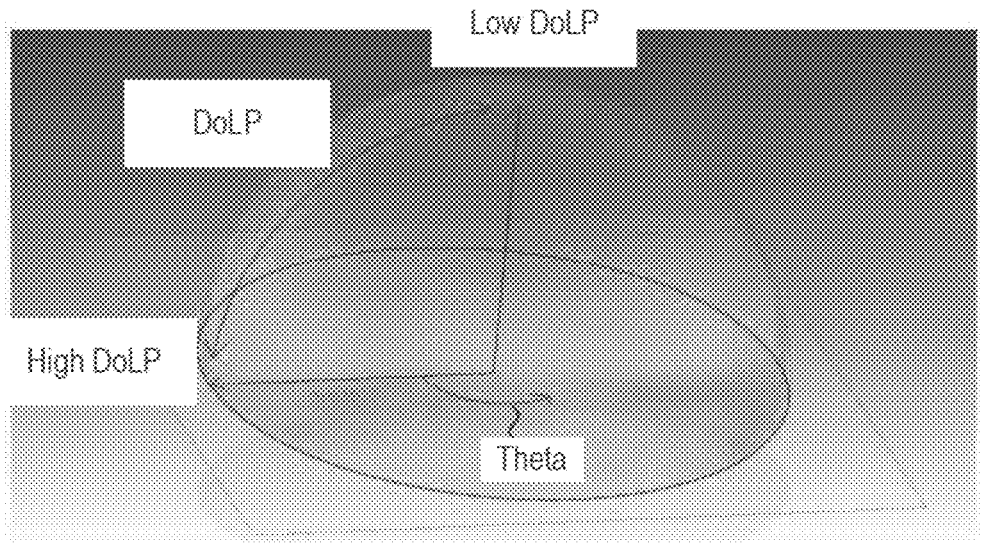
FIG. 2A shows an example of degrees of linear polarization of electromagnetic radiation and its correlation to a direction cosine of the electromagnetic radiation.
Figure 2B:
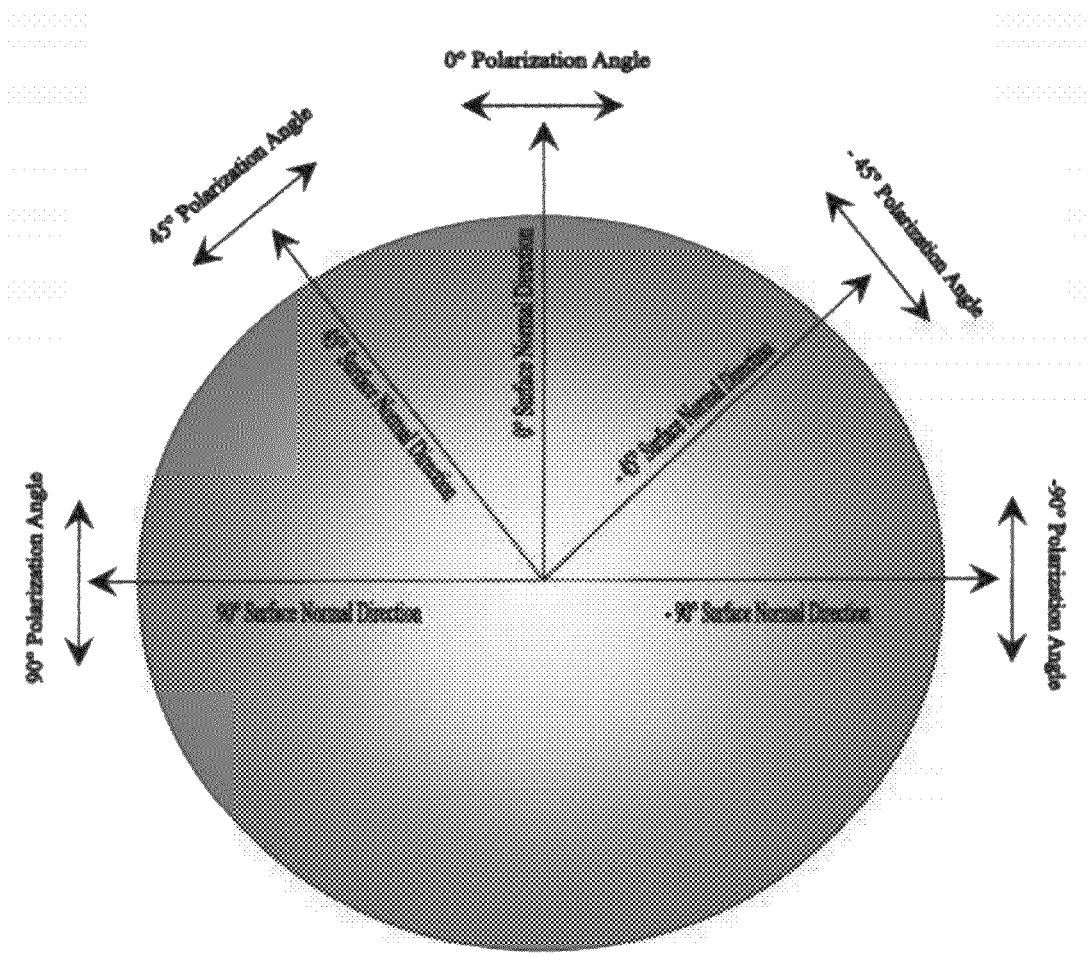
FIG. 2B shows an example of a correspondence between a direction of a surface normal of electromagnetic radiation and a polarization angle of the electromagnetic radiation.

Referring to FIG. 1A again, the SPI sensor 106-1 itself is not configured to produce grayscale or color images, although grayscale and color images may be captured as part of the entirety of the integrated imaging system 100. Rather, in a general aspect, the SPI sensor 106-1 is sensitive to spatial phase of the EM radiation 104 and re-describes the object 102 in terms of spatial phase data. In particular, the spatial phase of the EM radiation 104 emanating from the surfaces of the object 102, whether it is emitted, transmitted, or reflected, has a measurable spatial phase. Thus, the shape of the object 102, the type of material from which it is made, the orientation of the object 102 relative to the observer, etc., all affect the spatial phase of the EM radiation 104 emanating from the object 102. As a result, the various features of the object 102 (as well as various objects within the FOV of the system 100) each has a distinct spatial phase signature. In one example, the EM radiation 104 exhibits unique orientations based on its interaction with the object 102 and features thereof. As such, the EM radiation 104 contains information indicative of the interaction of EM energy with the object 102, and the SPI sensor 106-1 may be a shape-based sensor that is configured to passively capture spatial phase and radiometric information of the EM radiation 104 that is collected by the SPI sensor 106-1. For example, FIG. 2A shows that after interaction with the object 102, the percentage of linear polarization in the EM radiation 104 when reflected from a surface of the object 102 (indicated in FIG. 2A as a degree of linear polarization, DoLP) may be directly correlated to the direction cosine of the original EM energy incident on the object 102. Furthermore, the primary angle of the reflected linearly polarized light, which is indicated as Theta in FIG. 2A, may be mathematically related to the in-plane angle of the reflecting surface. For example, FIG. 2B shows an example of a correspondence between a direction of a surface normal and a surface angle of the EM radiation 104. In the example shown in FIG. 2B, which is a specific example where the correlation is defined relative to a reference coordinate frame, a 90-degree polarization angle may correspond to a 90-degree surface normal direction; a 45-degree polarization angle may correspond to a 45-degree surface normal direction; a 0-degree polarization angle may correspond to a 0-degree surface normal direction; a −45-degree polarization angle may correspond to a −45-degree surface normal direction; and a −90-degree polarization angle may correspond to a −90-degree surface normal direction. While FIG. 2B shows five specific angles of polarization, the angles of polarization can be of any value between 0 degrees and 360 degrees, or multiples thereof. It is noted that the example of FIG. 2B is merely illustrative and other correlations may be defined relative to other reference coordinate frame (e.g., relative to an object's surface or relative to a camera angle).

Figure 3A:
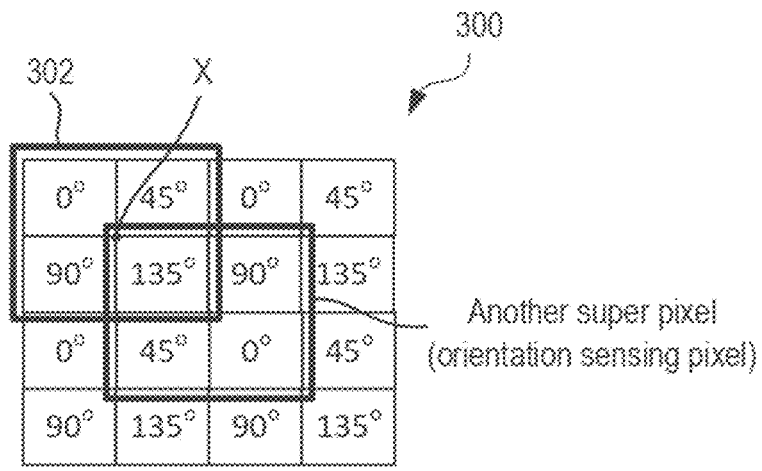
FIG. 3A shows a top-down view of an example electromagnetic detector of a spatial phase imaging.
Figure 3B:
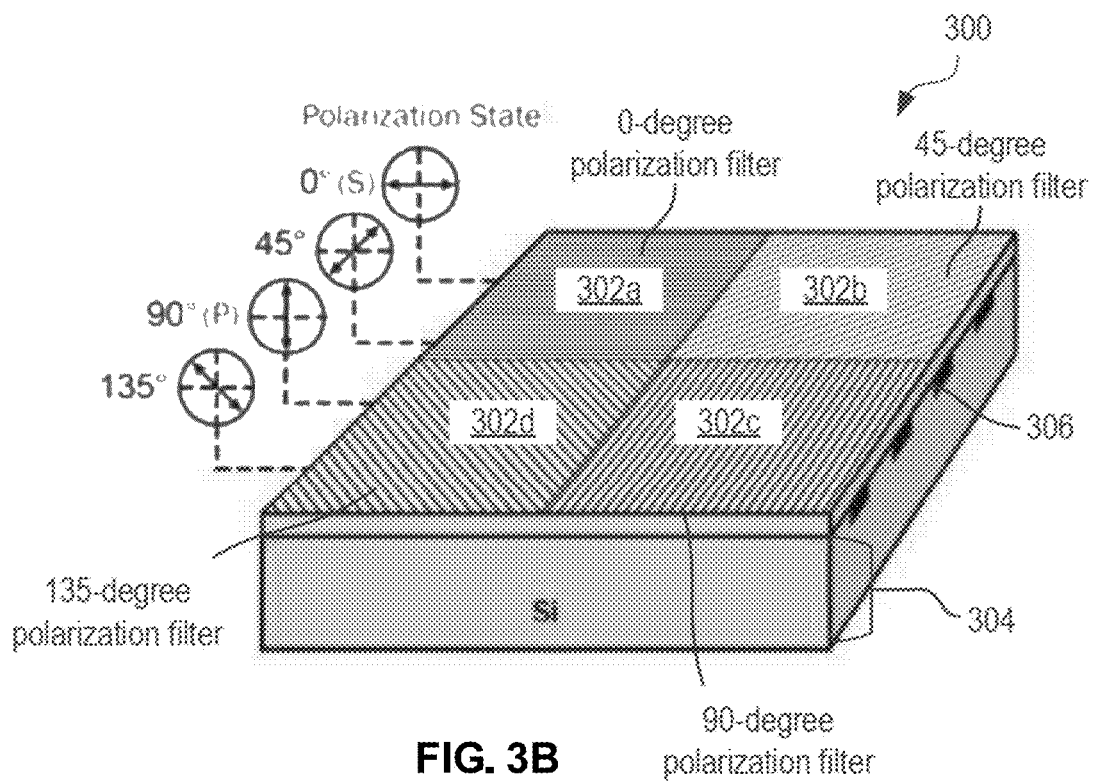
FIG. 3B shows a perspective view of an example super pixel of the electromagnetic detector shown in FIG. 3A.

The SPI-sensor 106-1 may include an EM detector (e.g., including an array of detector pixels) that is sensitive to the EM radiation 104 and orientations thereof. FIG. 3A shows a top-down view of an example EM detector 300 of the SPI sensor 106-1 including a "super" pixel 302. The super pixel 302 may be an orientation-sensing pixel (e.g., sensitive to orientations of the EM radiation 104) and may include a plurality of sub-pixels. Four sub-pixels 302a, 302b, 302c and 302d are shown in the example of FIG. 3A, although any number of sub-pixels may be possible in other examples. Furthermore, the pixels/sub-pixels may be arranged in any format. FIG. 3B shows a perspective view of the super pixel 302 illustrated in FIG. 3A. For illustrative purposes, the EM detector 300 is shown as a 4×4 pixel array in FIG. 3A; however, the EM detector 300 may include arrays of other sizes. The super pixel 302 is shown to be formed by a 2×2 pattern formed by the adjoining pixels 302a, 302b, 302c and 302d, although other super pixel sizes are possible in other examples. In some examples, the super pixel patterns are repeated, as seen in FIG. 3A, to form another super pixel. FIGS. 3A and 3B are examples of using pixel information to generate surface normal vectors; however, clustering does not require symmetrical pixels nor is clustering a technique to only obtain the shape of the object 102.

In the example of FIGS. 3A and 3B, the EM detector 300 may include an array of detector pixels 304 (e.g., implemented in silicon) and a polarizing array 306 disposed over the array of detector pixels 304. The polarizing array 306 can also be integrated into the photodiode and not on top of the sensing surface. Each photodiode can have a polarization sensitive anode and or cathode. When placed on top to work properly, the polarization arrays have to be tied to the pixel isolation barriers to create as much metal mass as possible to increase the EM field in desired direction. The EM radiation 104 is incident on the polarizing array 306, which filters the EM radiation 104 based on its orientation and rejecting all scattered or noise EM energy. The underlying array of detector pixels 304 records an intensity of the EM radiation 104 at each of the orientations. Stated differently, in the example shown in FIGS. 3A and 3B, the array of detector pixels 304 captures the frequency distribution (e.g., broadband) of photons at a particular angle of orientation, filtered by the polarizing array 306. Although angles can be of any value between 0 and 360 or multiples thereof, FIGS. 3A and 3B show four specific angles of orientation, namely 0-degrees, 45-degrees, 90-degrees, and 135-degrees merely for the sake of illustration.

In some implementations, the detector pixels 304 may include complementary metal-oxide-semiconductor elements (e.g., CMOS photodiodes). However, the array of detector pixels 304 may be include pixel elements implemented using other technologies, examples being charge coupled devices (CCDs), longwave infrared (LWIR) detectors, X-ray detectors, to name a few. Therefore, depending on the type of pixel elements used for the array of detector pixels 304, the SPI sensor 106-1 may be sensitive to colored EM radiation 104 (e.g., RGB color), monochrome EM radiation 104, or EM radiation 104 having other wavelength ranges such as ultraviolet, visible, near infrared (NIR), medium wavelength infrared (MWIR), long wavelength infrared (LWIR), radio, gamma, X-ray, radiation in the terahertz range, etc. Stated differently, by selecting appropriate detector pixels 304 for the EM detector 300, the SPI sensor 106-1 may be sensitive to EM radiation 104 encompassing any and all wave energy in the spectrum of EM energy. Therefore, the SPI sensor 106-1 may be configured to single or multiple wavelengths or wavebands (e.g., including various separations of specular and diffuse bands) to determine the various features of the object 102. This provides the advantage of upward compatibility with any currently available imaging modality.

In some implementations, the polarizing array 306 may include nanowires having different orientations. For example, the polarizing array 306 may include a 0-degrees polarization filter, as shown in FIGS. 3A and 3B, and the 0-degree polarization filter may be implemented using a metallic grid of nanowires having a 0-degree orientation. Similarly, the polarizing array 306 may include a 90-degrees polarization filter, as shown in FIGS. 3A and 3B, and the 90-degree polarization filter may be implemented using a metallic grid of nanowires having a 90-degree orientation. A similar concept is applicable to the 45-degrees polarization filter and the 135-degrees polarization filter shown in FIGS. 3A and 3B. In some implementations, each metallic grid of nanowires may include wires having a thickness of about 60 nanometers and having a metallic grid spacing (e.g., a pitch) of about 60 nanometers. While the example described above contemplates examples where the polarizing array 306 includes nanowires having different orientations, any type of polarizing array 306 may be used. The preference is to place these grids on the anode and cathode of the respective photodiode elements, by forming the polarization sensitive photodiode we have the advantage of increasing the effective angular signal from the surface and the accuracy of the 3D measurements due to the elimination of noise in the SPI sensor. An advantage of using the polarizing array 306 as a filter for various orientations of the EM radiation 104 is that it allows the SPI sensor 106-1 to generate spatial phase data having a high dynamic range (e.g., since noise in the EM radiation 104 is substantially reduced). Such noise (e.g., scattering) in the EM radiation 104 may, as an example, be generated when the EM radiation is emitted by, reflected off, or transmitted through various features (e.g., diffuse features) of the object 102. As another example, such noise in the EM radiation 104 may be generated by disperse media (e.g., mist, fog, smoke, or other obscurants) located in the environment between the SPI sensor 106-1 and the object 102.

In some examples, the EM detector 300 includes readout circuitry that captures the intensities of the EM radiation 104 recorded by each of the pixels 302a, 302b, 302c and 302d. The readout circuitry provides such intensities of the EM radiation 104 at each of the orientations (e.g., 0-degrees, 45-degrees, 90-degrees, 135-degrees) to the one or more processors 108 for further processing. Another example is the use of analog processing the angular data in the readout electronics. The full angular processing can be done at the analog level as it passes out of the photodiode.

Figure 5:
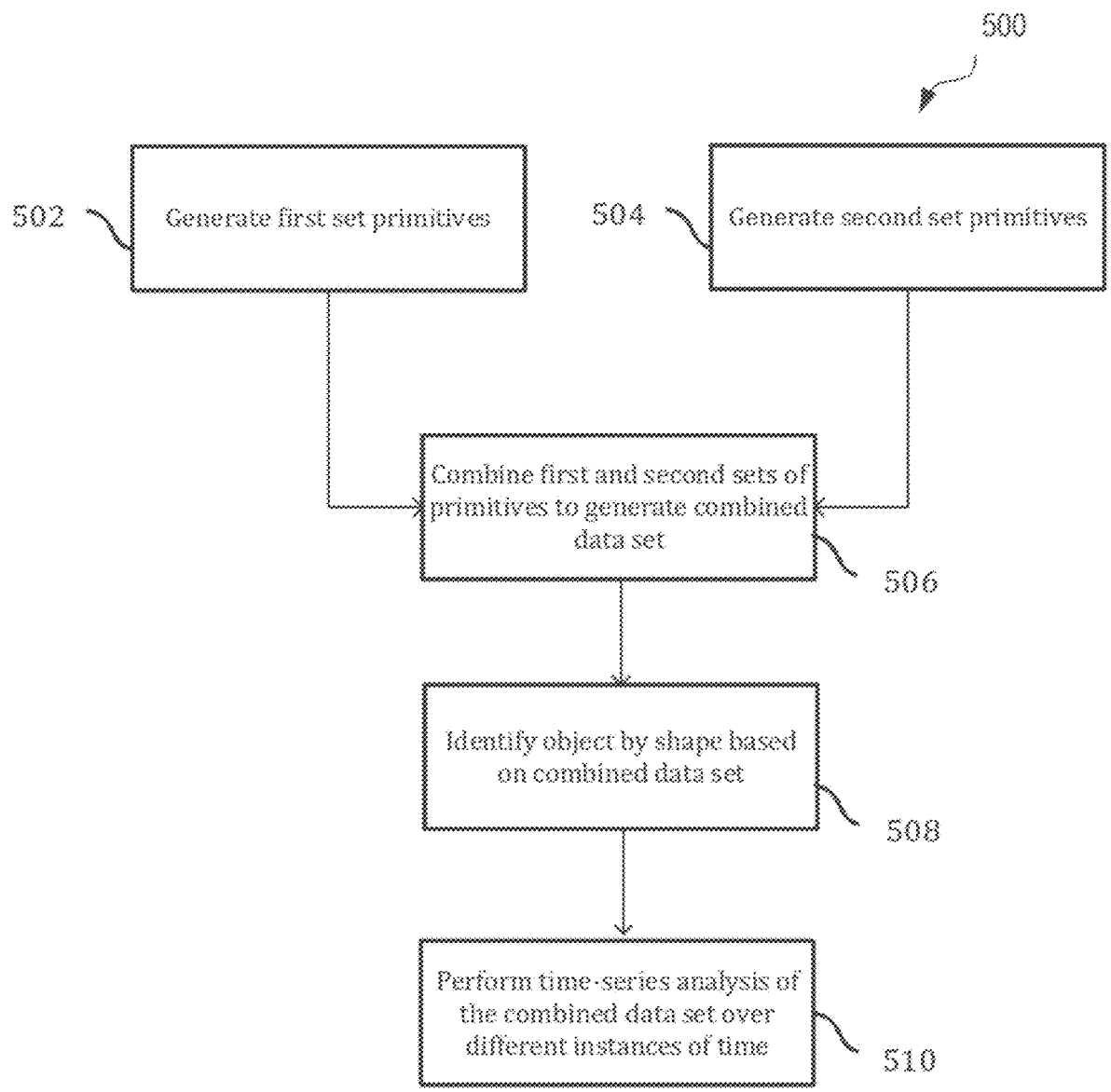
FIG. 5 shows an example method that may be executed by one or more processors of the integrated imaging system of FIG. 1A.
Figure 10:
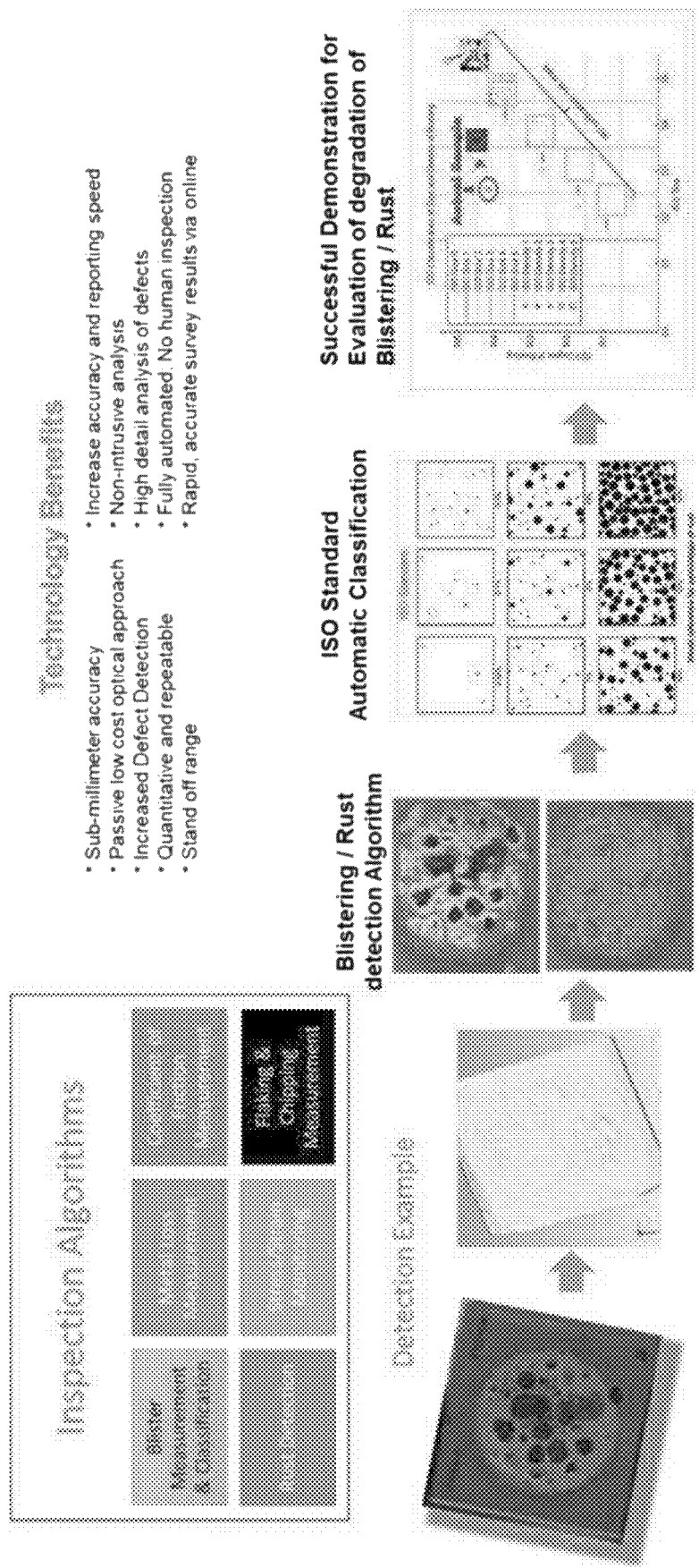
FIG. 10 shows an application of the integrated imaging system shown in FIG. 1A.

FIG. 5 shows an example method 500 executed by the one or more processors 108. At 502, the one or more processors 108 generate a first set of primitives based on the spatial phase data from the SPI sensor 106-1. The first set of primitives includes both first- and second-level primitives, as discussed below. For example, supposing that in the examples shown in FIGS. 3A and 3B, 10 is the intensity detected (e.g., in number of counts) at the pixel 302a having the 0-degree polarizer, i45 is the intensity detected at the pixel 302b having the 45-degree polarizer, i90 is the intensity detected at the pixel 302c having the 90-degree polarizer, i135 is the intensity detected at the pixel 302d having the 135-degree polarizer, and iRHC and iLHC are the intensities of right-handed circular polarization and left-handed circular polarization, respectively, then the one or more processors 108 may define an intensity array I as follows:

$$I = \begin{pmatrix} i0 \\ i45 \\ i90 \\ i135 \\ iRHC \\ iLHC \end{pmatrix}$$

In the example shown above, it is assumed that the EM detector 300 also includes pixels that are sensitive to the intensities of right-handed circular polarization and left-handed circular polarization.

The one or more processors 108 may subsequently determine a Stokes vector, which may be expressed as follows:

$$S = \begin{pmatrix} s0 \\ s1 \\ s2 \\ s3 \end{pmatrix}$$

where s0 in the amount of unpolarized EM radiation 104 (e.g., preferential to a 0-degree polarization), s1 is the amount of EM radiation 104 preferential to a 90-degree polarization, s2 is the amount of EM radiation 104 preferential to a 45-degree polarization, and s3 is the amount of EM radiation 104 preferential to a right-handed circular polarization.

The one or more processors 108 may define a diattenuation vector D as follows:

$$D = \begin{pmatrix} d0 \\ d45 \\ d90 \\ d135 \\ dRHC \\ dLHC \end{pmatrix}$$

where d0 is the diattenuation of pixel 302a having the 0-degree polarizer, d45 is the diattenuation of pixel 302b having the 45-degree polarizer, d90 is the diattenuation of pixel 302c having the 90-degree polarizer, d135 is the diattenuation of pixel 302d having the 135-degree polarizer, and dRHC and dLHC are the diattenuations of right-handed circular polarization and left-handed circular polarization, respectively.

In general, the diattenuation d for each of the pixels 302a, 302b, 302c, 302d may be determined by the one or more processors 108 as follows:

$$d = \frac{p - c}{p + c}.$$

where p is the intensity of a parallel polarized state and c is an intensity of a cross-polarized state. The diattenuation d of each of the pixels 302a, 302b, 302c, 302d may be a measure of an effectiveness of the polarizer, with a perfect polarizer having a diattenuation of 1.

The one or more processors 108 may relate the Stokes vectors with the intensity vectors as follows:

$$2*\begin{pmatrix} i0 \\ i45 \\ i90 \\ i135 \\ iRHC \\ iLHC \end{pmatrix} =$$

$$\begin{pmatrix} 1 & d0*\cos(2*(0+90)) & d0*\sin(2*0) & 0 \\ 1 & d45*\cos(2*(45+90)) & d45*\sin(2*45) & 0 \\ 1 & d90*\cos(2*(90+90)) & d90*\sin(2*90) & 0 \\ 1 & d135*\cos(2*(135+90)) & d135*\sin(2*135) & 0 \\ 1 & 0 & 0 & dRHC*\sin(2*(135-135)) \\ 1 & 0 & 0 & dLHC*\sin(2*(45+225)) \end{pmatrix} * \begin{pmatrix} s0 \\ s1 \\ s2 \\ s3 \end{pmatrix}$$

For the ideal case where all diattenuations d are equal to 1, the one or more processors 108 may relate the Stokes vectors with the intensity vectors as follows:

$$2*\begin{pmatrix} i0 \\ i45 \\ i90 \\ i135 \\ iRHC \\ iLHC \end{pmatrix} = \begin{pmatrix} 1 & -1 & 0 & 0 \\ 1 & 0 & 1 & 0 \\ 1 & 1 & 0 & 0 \\ 1 & 0 & -1 & 0 \\ 1 & 0 & 0 & 1 \\ 1 & 0 & 0 & -1 \end{pmatrix} * \begin{pmatrix} s0 \\ s1 \\ s2 \\ s3 \end{pmatrix}$$

$$2*\begin{pmatrix} i0 \\ i45 \\ i90 \\ iRHC \\ iLHC \end{pmatrix} = \begin{pmatrix} 0.4 & -0.5 & -0.1 & 0 \\ 0.4 & 0 & 0.4 & 0 \\ 0.4 & 0.5 & -0.1 & 0 \\ 0.6 & 0 & 0.1 & 0.5 \\ 0.6 & 0 & 0.1 & -0.5 \end{pmatrix} * \begin{pmatrix} s0 \\ s1 \\ s2 \\ s3 \end{pmatrix}$$

$$2*\begin{pmatrix} s0 \\ s1 \\ s2 \\ s3 \end{pmatrix} =$$

$$\begin{pmatrix} \frac{1}{3} & \frac{1}{3} & \frac{1}{3} & \frac{1}{3} & \frac{1}{3} & \frac{1}{3} \\ -1 & 0 & 1 & 0 & 0 & 0 \\ 0 & 1 & 0 & -1 & 0 & 0 \\ 0 & 0 & 0 & 0 & 1 & -1 \end{pmatrix} * \begin{pmatrix} i0 \\ i45 \\ i90 \\ i135 \\ iRHC \\ iLHC \end{pmatrix} = \begin{pmatrix} 0.5 & 0 & 0.5 & 0.5 & 0.5 \\ -1 & 0 & 1 & 0 & 0 \\ -1 & 2 & -1 & 0 & 0 \\ 0 & 0 & 0 & 1 & -1 \end{pmatrix} * \begin{pmatrix} i0 \\ i45 \\ i90 \\ iRHC \\ iLHC \end{pmatrix}$$

$$2*\begin{pmatrix} s0 \\ s1 \\ s2 \end{pmatrix} = \begin{pmatrix} 1 & 0 & 1 & 0 \\ -1 & 0 & 1 & 0 \\ 0 & 1 & 0 & -1 \end{pmatrix} * \begin{pmatrix} i0 \\ i45 \\ i90 \\ i135 \end{pmatrix} = \begin{pmatrix} 1 & 0 & 1 \\ -1 & 0 & 1 \\ -1 & 2 & -1 \end{pmatrix} * \begin{pmatrix} i0 \\ i45 \\ i90 \end{pmatrix}$$

For a non-ideal case where at least one diattenuation d is less than 1, the one or more processors 108 may relate the Stokes vectors with the intensity vectors as follows:

$$2*\begin{pmatrix} i0 \\ i45 \\ i90 \\ i135 \\ iRHC \\ iLHC \end{pmatrix} = \begin{pmatrix} 1 & -d0 & 0 & 0 \\ 1 & 0 & d45 & 0 \\ 1 & d90 & 0 & 0 \\ 1 & 0 & -d135 & 0 \\ 1 & 0 & 0 & dRHC \\ 1 & 0 & 0 & -dLHC \end{pmatrix} * \begin{pmatrix} s0 \\ s1 \\ s2 \\ s3 \end{pmatrix} =$$

-continued $$\begin{pmatrix} d0 & \frac{1-d0}{2} & 0 & \frac{1-d0}{2} & 0 & 0 \\ \frac{1-d45}{2} & d45 & \frac{1-d45}{2} & 0 & 0 & 0 \\ 0 & \frac{1-d90}{2} & d90 & \frac{1-d90}{2} & 0 & 0 \\ \frac{1-d135}{2} & 0 & \frac{1-d135}{2} & d135 & 0 & 0 \\ 0 & 0 & 0 & 0 & \frac{1+dRHC}{2} & \frac{1-dRHC}{2} \\ 0 & 0 & 0 & 0 & \frac{1-dLHC}{2} & \frac{1+dLHC}{2} \end{pmatrix} *$$

$$\begin{pmatrix} 1 & -1 & 0 & 0 \\ 1 & 0 & 1 & 0 \\ 1 & 1 & 0 & 0 \\ 1 & 0 & -1 & 0 \\ 1 & 0 & 0 & 1 \\ 1 & 0 & 0 & -1 \end{pmatrix} * \begin{pmatrix} s0 \\ s1 \\ s2 \\ s3 \end{pmatrix}$$

Figure 4:
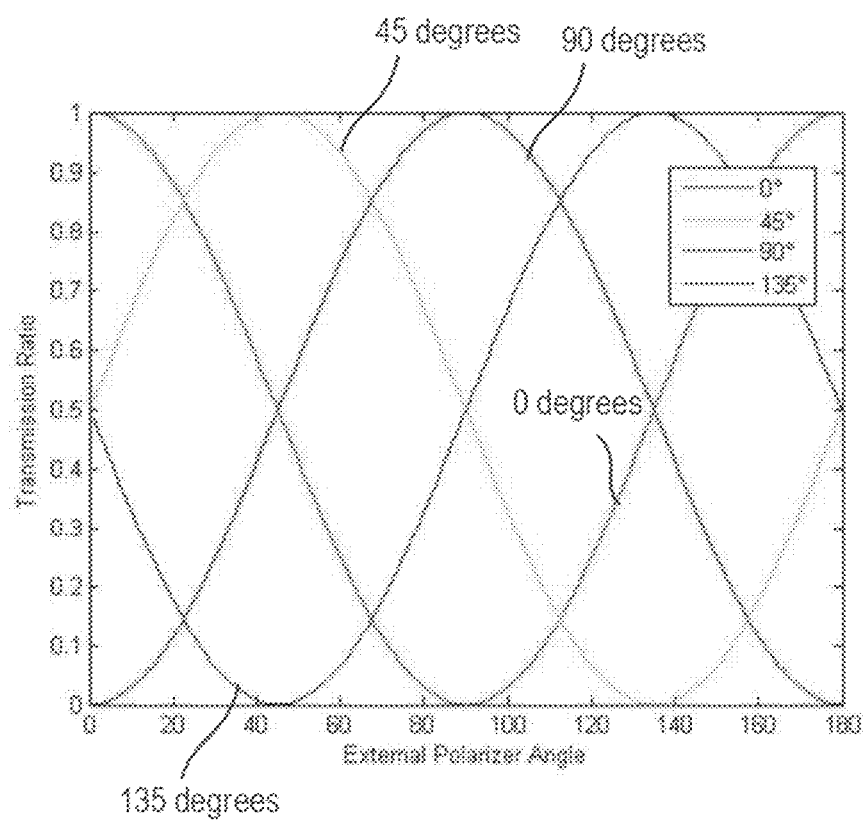
FIG. 4 shows an example plot of an ideal transmission ratio when electromagnetic radiation passes through two polarizers at different orientations.

The one or more processors 108 may also be configured to determine a Mueller matrix calibration. For example, when EM radiation 104 passes through two polarizers at orientations $\theta_1$ and $\theta_2$, a theoretical transmission ratio is $\cos^2(\theta_1-\theta_2)$. For the example, for the polarizing array 306 shown in FIGS. 3A and 3B (e.g., having the 0-degree, 45-degree, 90-degree, and 135-degree polarization filters), an ideal transmission ratio is as depicted in FIG. 4. In the example of FIG. 4, the maximum point on the curve is the parallel polarized state while the minimum point is the cross-polarized state. Many other properties can also be derived from this, such as the ratio of unpolarized to polarized, the elliptical form of the surfaces of the object 102, the index of refraction of materials of the object 102, whether the materials of the object 102 is organic or materials, and an indication of the structure of the materials of the object 102, to name a few.

In practice, the intensities i (e.g., included in the intensity array I) have the following form $i=a+b*\cos^2(\theta_1-\theta_2+c)$. The above-mentioned Mueller matrix corrects for rotational errors (e.g. errors in the value c) and diattenuation errors (e.g., errors in the value a) that are induced by a non-ideal polarizing array 306. The corrected intensity array I' may be expressed as follows:

$$I' = \begin{pmatrix} i0' \\ i45' \\ i90' \\ i135' \end{pmatrix} = \begin{pmatrix} 1 & -1 & 0 \\ 1 & 0 & 1 \\ 1 & 1 & 0 \\ 1 & 0 & -1 \end{pmatrix} * \begin{pmatrix} 1 & -d0 & 0 \\ 1 & 0 & d45 \\ 1 & d90 & 0 \\ 1 & 0 & -d135 \end{pmatrix}^{-1} * \begin{pmatrix} i0 \\ i45 \\ i90 \\ i135 \end{pmatrix} =$$

$$\begin{pmatrix} 1 & -1 & 0 \\ 1 & 0 & 1 \\ 1 & 1 & 0 \\ 1 & 0 & -1 \end{pmatrix} * \begin{pmatrix} 0.25 & 0.25 & 0.25 & 0.25 \\ -0.5 & 0 & 0.5 & 0 \\ 0 & 0.5 & 0 & -0.5 \end{pmatrix} *$$

$$\begin{pmatrix} d0 & \frac{1-d0}{2} & 0 & \frac{1-d0}{2} \\ \frac{1-d45}{2} & d45 & \frac{1-d45}{2} & 0 \\ 0 & \frac{1-d90}{2} & d90 & \frac{1-d90}{2} \\ \frac{1-d135}{2} & 0 & \frac{1-d135}{2} & d135 \end{pmatrix}^{-1} * \begin{pmatrix} i0 \\ i45 \\ i90 \\ i135 \end{pmatrix} =$$

$$\begin{pmatrix} 0.75 & 0.25 & -0.25 & 0.25 \\ 0.25 & 0.75 & 0.25 & -0.25 \\ -0.25 & 0.25 & 0.75 & 0.25 \\ 0.25 & -0.25 & 0.25 & 0.75 \end{pmatrix} *$$

$$\begin{pmatrix} d0 & \frac{1-d0}{2} & 0 & \frac{1-d0}{2} \\ \frac{1-d45}{2} & d45 & \frac{1-d45}{2} & 0 \\ 0 & \frac{1-d90}{2} & d90 & \frac{1-d90}{2} \\ \frac{1-d135}{2} & 0 & \frac{1-d135}{2} & d135 \end{pmatrix}^{-1} * \begin{pmatrix} i0 \\ i45 \\ i90 \\ i135 \end{pmatrix}$$

For the case of rotating polarizers or each pixel having different polarization rotations, a corrected diattenuation vector D' may be determined by the one or more processors 108 as follows:

$$D' = \begin{pmatrix} d0' \\ d45' \\ d90' \\ d135' \end{pmatrix},$$

where $d' = \frac{(p_{max} - p_{min}) + (c_{max} - c_{min})}{(p_{max} - p_{min}) - (c_{max} - c_{min})}$ where p is the intensity of a parallel polarized state, c is an intensity of a cross-polarized state, the subscript max indicating the brighter backlit intensity, and the subscript min indicating the dimmer backlit intensity.

As discussed above, the percentage of linear polarization in the EM radiation 104 when reflected from a surface of the object 102 (e.g., indicated in FIG. 2A as a degree of linear polarization, DoLP) may be directly correlated to the direction cosine of the original EM energy incident on the object 102. Furthermore, the primary angle of the reflected linearly polarized light, which is indicated as Theta in FIG. 2A, may be mathematically related to the in-plane angle of the reflecting surface. The one or more processors 108 may determine the degree of linear polarization DoLP and the angle of linear polarization Theta as follows:

$$\theta = 0.5 \times \operatorname{atan2}(s2, -s1)$$

$$DoLP = \frac{\sqrt{s1^2 + s2^2}}{s0}$$

The angle Theta may be in a range from $-\pi/2$ to $\pi/2$, with 0 radians indicating a linear polarization pointing up in image space (e.g. as seen in FIG. 2B). Consequently, the angle Theta encodes the in-plane angle of a normal to a surface of the object 102 or portion thereof captured by the pixel. The degree of linear polarization DoLP may be in a range from 0 to 1. The value 0 for the degree of linear polarization DoLP may indicate a completely unpolarized scene, while the value 1 for the degree of linear polarization DoLP may indicate a completely polarized scene. Consequently, the degree of linear polarization DoLP encodes the out-of-plane angle of a normal to a surface of the object 102 or portion thereof captured by the pixel.

In addition to the degree of linear polarization DoLP and angle Theta, several other measures of polarization may be determined by the one or more processors 108. For example, the one or more processors 108 may determine a degree of circular polarization (DoCP) and a total degree of polarization (DoP) as follows:

$$DoCP = \frac{s3}{s0}$$

$$DoP = \frac{\sqrt{s1^2 + s2^2 + s3^2}}{s0}$$

In general, the degree of circular polarization DoCP may be in a range from −1 (indicating a 100% left circular polarization) to +1 (indicating a 100% right circular polarization), with 0 indicating no circular polarization. The total degree of polarization DoP indicates the degree of both circular and linear polarization and may be in a range from 1 (representing a completely polarized scene) to 0 (representing a completely unpolarized scene).

Based on the above-described measures, the one or more processors 108 may determine the surface normal vector for each for each pixel as follows:

$$\begin{pmatrix} nx \\ ny \\ nz \end{pmatrix} = \begin{pmatrix} -\sin(\gamma) * \sin(\theta) \\ \sin(\gamma) * \cos(\theta) \\ \cos(\gamma) \end{pmatrix}$$

where nx, ny, nz are the x, y, and z coordinates of the surface normal vector, where γ is the out-of-plane angle, and θ is the in-plane angle.

Figure 6:
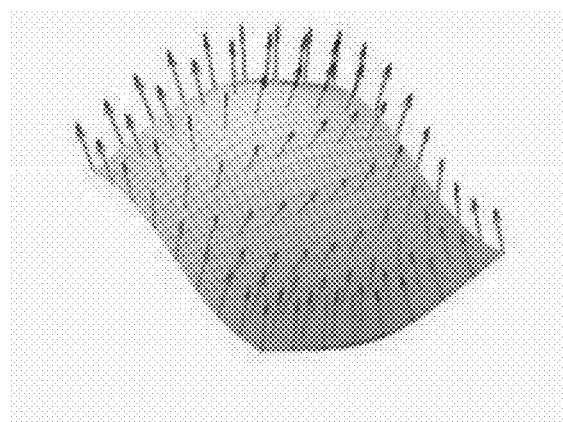
FIG. 6 shows an example three-dimensional distribution of surface normal vectors of an object.

Based on the discussion above, the one or more processors 108 generates the first set of primitives (including its respective first-level primitives and second-level primitives) based on the spatial phase data from the SPI sensor 106-1. Example first-level primitives of the first set include the above-described intensities i0, i45, i90, and i135, and the intensities of red, blue, and green light (e.g., in implementations where a color-sensitive EM detector 300 is used in the SPI sensor 106-1). Example second-level primitives of the first set include the above-described Stokes parameters s0, s1, s2, and s3; the diattenuation values d0, d45, d90, and d135; the angle of linear polarization Theta; the degree of linear polarization DoLP; the out-of-plane angle γ of the surface normal vector; the x, y, and z coordinates of the surface normal vector (e.g., nx, ny, nz described above); the ideal surface normals calculated for an ideal surface; the corrected surface normals; and the variables in the Mueller matrix. The first set of primitives computed from the spatial phase data are indicative of various features of the object 102, which may be represented by a broad number of parameters beyond just surface normal vectors, examples being a degree of linear polarization, geometry, a frequency distribution of the EM radiation emanating from the object 102, angles of various surfaces of the object, identification of material(s) of the object (e.g., dielectric constants), etc. In some implementations, the data from the first set of primitives may be displayed on a graphical display system as a 3D reconstruction of the object 102, although such a graphical representation is not necessary. As an example, the first set of primitives includes surface normal vectors, that may be graphically represented as shown in the example of FIG. 6. Many of the primitives can be calculated in almost real time (near time) such that they are usable in applications such as autonomy, stress strain, etc.

In the example of FIG. 6, the 3D distribution of the surface normal vectors shows that additional insights into the relationships among the surfaces of the object 102 may be gleaned for a given frame. Such relationship among these surface normal vectors may be invariant to orientation in the physical world and may allow for the tracking of the shape or motion of the object 102. Therefore, in some examples, the data included in the first set of primitives may be further processed to identify a collection and clustering of similar and non-similar angle data. As an example, the one or more processors 108 may determine a change in direction of the surface normal vectors across a surface 102, a rate of change in the direction of surface normal vectors across a surface of the object 102, and a pixel surface orientation (e.g., an indication of a 3D surface orientation determined by the coordinates of the surface normal vectors). The 3D reconstruction of the object 102, the change in the direction of surface normal vectors, the rate of such a change, and the pixel surface orientation may also be identified with second-level primitives computed from the spatial phase data of the SPI sensor 106-1. The first set of primitives may be intelligently interpreted into a real-world meaningful shape (e.g., an identification of whether the object 102 is a person, car, pipe, etc.). Such a shape may be digitally created by combining one or more of the pixel data. For example, the object 102 may also be represented by a series of panels and shapes, with invariant slope and differencing between sections such as panels, slopes and change in slopes. The perspective of each surface panel and its relationship to neighboring surfaces therefore creates an invariant real-world object shape. Therefore, the one or more processors 108 may be capable of direct surface detection and mapping in real world variables. The examples described above is merely one specific example of clustering. The proposed integrated imaging systems enables the examination of the pixels in a single frame or across frames as clusters of primitives or attributes. Such clustering may be based on, for example, angle as referenced or change in velocity of normal, etc. Clustering at that level allows the integrated imaging system to perform higher order shape recognition often called "segmentation". Therefore, segmentation can be based on clustering of different attributes from the SPI sensor 106-1.

In some implementations, the first set of primitives (e.g., including the first- and second-level primitives) generated from the spatial phase data of the SPI sensor 106-1 may be used to enhance AI algorithms. For example, the first set of primitives may be used to generate a light map of the object 102. AI algorithms may be trained on light maps and enhanced by allowing simple correction or adaptation of the lighting, by providing simple surface normals, surface angles, classical polarization images, color and spectral tied directly to shape, angle invariant clusters, slope vectors at the pixel, cluster and image level, shape information, etc.

As discussed above, the integrated imaging system 100 includes the second sensor 106-2. Data from the second sensor (if present) is generated at the same time that spatial phase data is generated by the SPI sensor 106-1. In the method 500 of FIG. 5 (e.g., at 504), the one or more processors 108 may generate a second set primitives (e.g., also including a collection of first- and second-level primitives) based on the data from the second sensor 106-2 (if present). As examples, the first-level primitives of the second set include a depth map, a luminance map, a color stream map, temperature data, calibration data obtained from the calibration of the SPI sensor 106-1 and the second sensor 106-2 to each other, an inclinometric map indicating the orientation of the second sensor 106-2, or location data. Example second-level primitives of the second set include an indication of a hemisphere direction (e.g., which defines a positive or negative direction of surface normals in a 360-degree 3D space) and an associated hemisphere confidence level (e.g., which defines the certainty associate with the positive or negative hemisphere direction).

Figure 7:
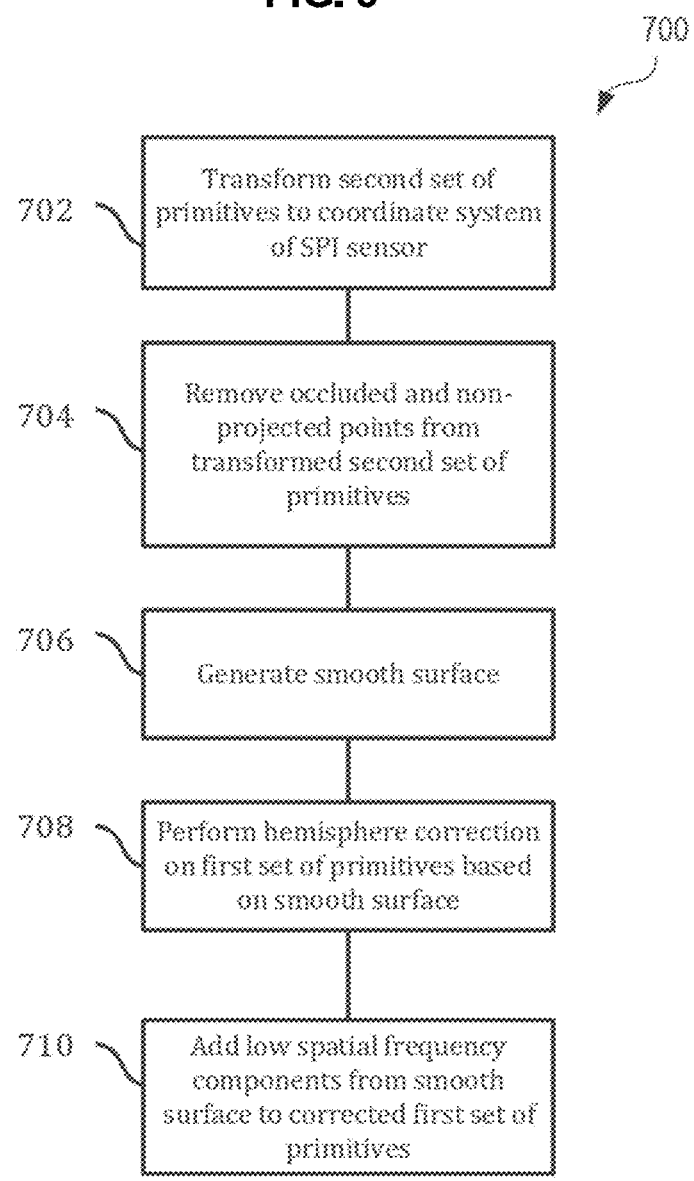
FIG. 7 shows an example method of combining a first set of primitives and a second set of primitives.

The one or more processors 108 may subsequently combine (e.g., in 506 of method 500) the first and second sets of primitives, thereby generating the combined data set that is a dense, high-resolution, accurate, and information-rich representation of the object 102. FIG. 7 shows an example method 700 of combining the first and second sets of primitives. At 702 of method 700, the second set of primitives (e.g., computed from data from the second sensor 106-2) is transformed into the coordinate system of the SPI sensor 106-1. This may be accomplished using the matrices computed for the calibration of the SPI sensor 106-1 and the second sensor 106-2 to each other.

At 704, occluded and non-projected points of the transformed second set of primitives (e.g., from the perspective of the SPI sensor 106-1) are removed. This may be accomplished by comparing coordinates associated with the SPI sensor 106-1 with coordinates associated with the transformed second set of primitives. When a particular coordinate of the SPI sensor 106-1 has an associated transformed second set of primitives, then the transformed second set of primitives for that particular coordinate is retained. However, when a particular coordinate of the SPI sensor 106-1 does not have an associated transformed second set of primitives, then the transformed second set of primitives for that particular coordinate is discarded.

At 706, a smooth surface is generated from the transformed second set of primitives that are retained. The transformed second set of primitives that are retained have the same spatial resolution as the first set of primitives and may be generated based on hybrid inverse distance weighting with offset, which may be expressed as follows:

$$w(r)=1/(p+r^{(2*q)}) \text{ for some } p,q>0$$

At 708, the smooth surface generated at 706 is used to perform a hemisphere correction on the first set of primitives (e.g., the second-level primitives of the first set). For example, hemisphere correction may be performed on the surface normals from polarization, since the surface normal vectors have an ambiguity of whether its angle is 0 or (0+T). Hemisphere correction is done by determining the upper and lower hemisphere normal from the surface and then correcting the surface normal vectors associated with the first set of primitives.

At 610, low spatial frequency components of the smooth surface (e.g., generated at 706) are added to the corrected first set of primitives (e.g. the corrected second-level primitives of the first set). In some implementations, adding the low spatial frequency components of the smooth surface corrects for low frequency errors that can accumulate when interpolating the second-level primitives of the first set (e.g., when interpolating from surface normal vectors).

The result of method 700 is the generation of a combined data set that is the dense, high-resolution, accurate, and information-rich representation of the various features of the object 102. In some examples, appropriate data from the combined data set may be displayed by a display system (e.g., display system 112 shown in FIG. 1A). Any 3D display system that uses spatial phase components may be used to display the combined data set. A 3D image depicted on the display system 112 provides understanding of the combined data set in a volumetric form and allows a human to envision the object 102 with its full 3D surfaces. The combined data set may be displayed in various forms through transformation and translation algorithms such as high-resolution point clouds, high resolution triangular mesh, high resolution square mesh, 3D solid models, etc. The above-described use of the display system is merely an example of displaying one aspect of the information-rich data included in the combined data set.

Figure 9:
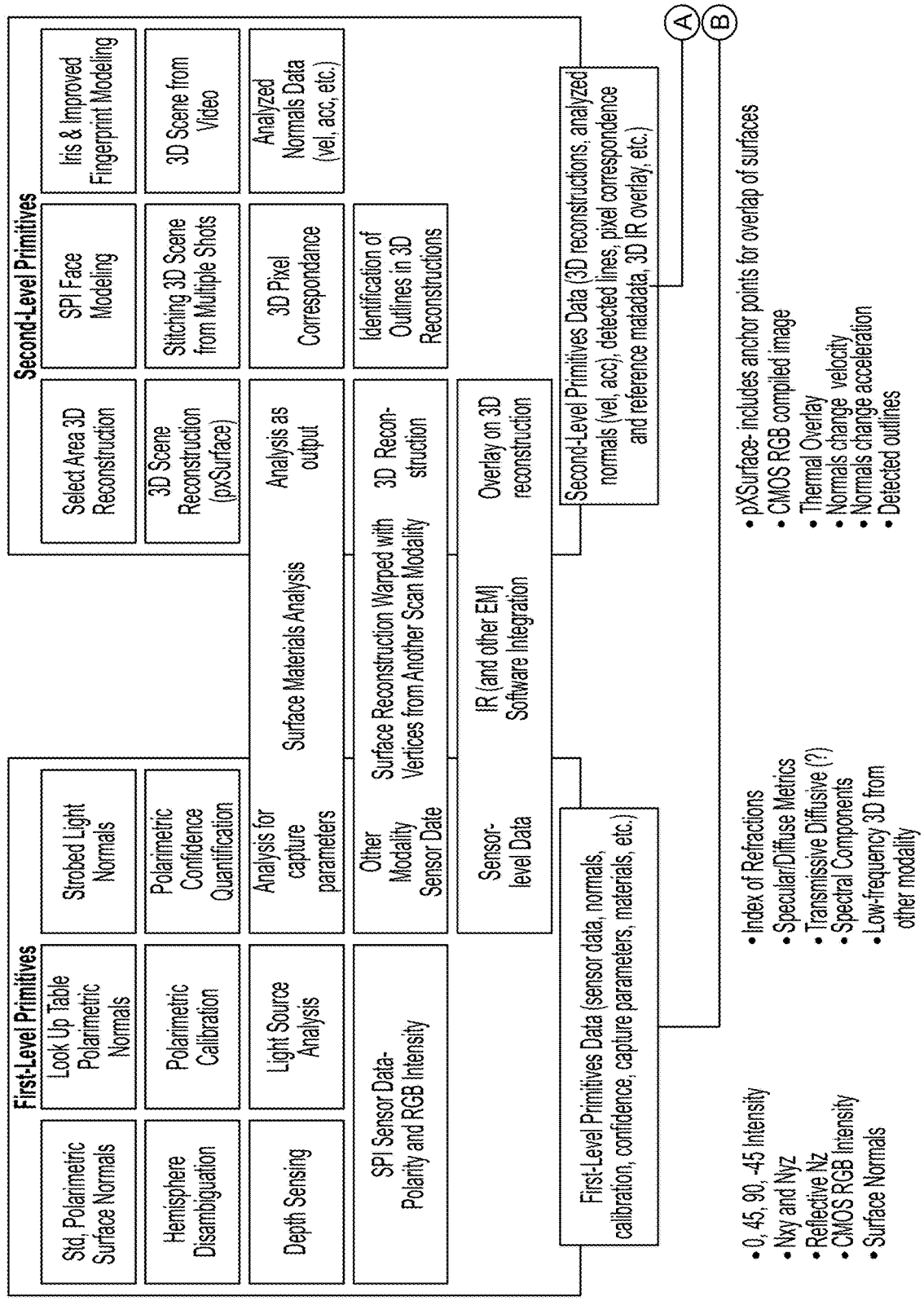
FIG. 9 shows how the methods shown in FIGS. 8A and 8B relate to a first set of primitives and a second set of primitives.
Figure 9:
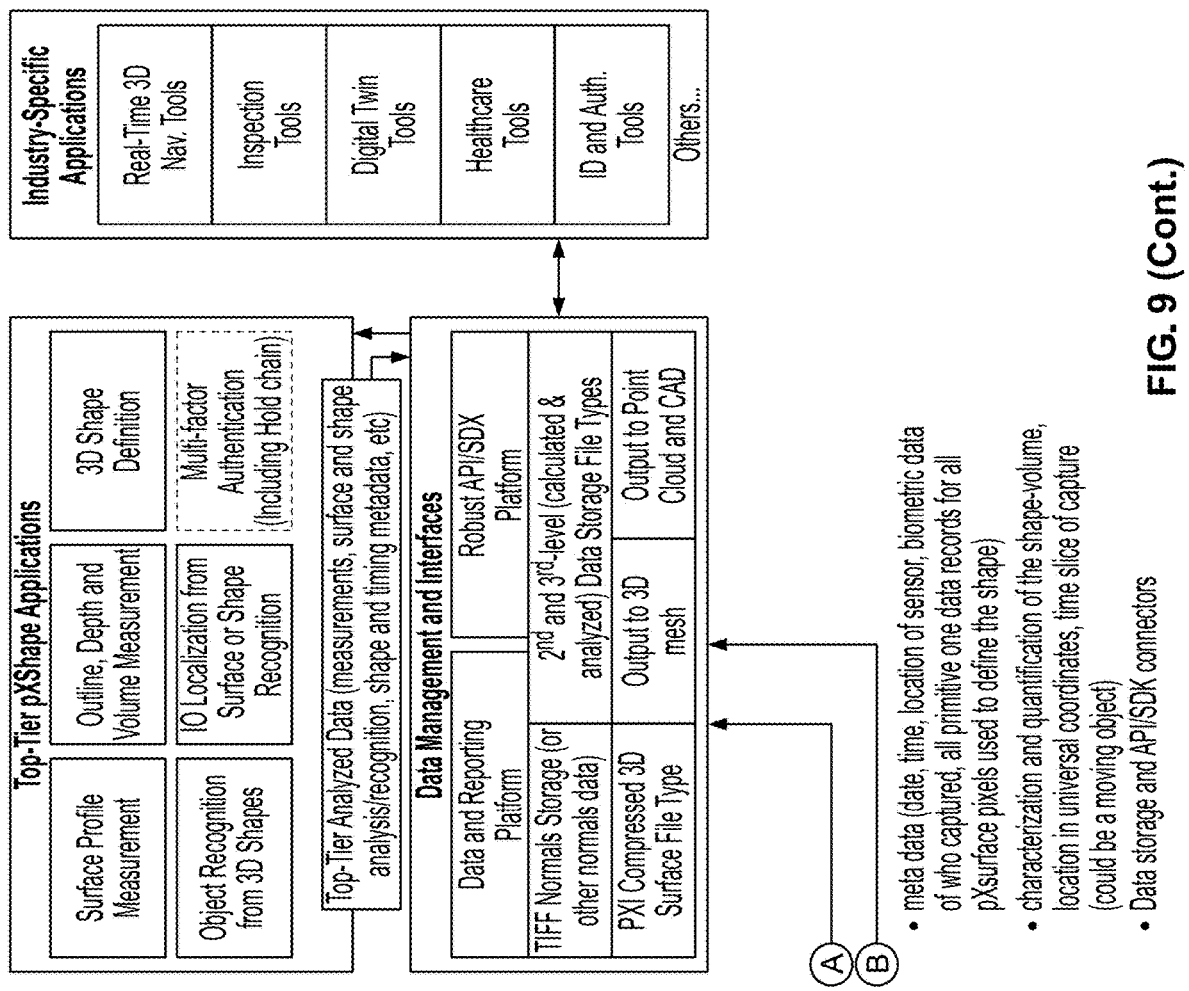

In some examples, such as in 508 of method 500, the object 102 may be identified by its shape based on the combined data set. FIGS. 8A and 8B shows example methods for creating surfaces and shapes of the object 102. FIG. 9 shows how the methods shown in FIGS. 8A and 8B relate to the first and second sets of primitives described above. In some examples, pixels may be spatially clustered and pixel-by-pixel orientation and slope vectors may be used to describe the shape and perspective of the surfaces (e.g., orientation of the object's facets) of the object 102 to one or more AI neural networks that operate on, for example, 3D objects. Real-world object coordinates may be correlated with the shapes and perspective of the surfaces. The grouping and clustering of oriented pixels/polygons can represent the shape of the object 102 in an automated fashion. As the object 102 is identified by its shape, a dynamic real-world model of the actual object 102 or a digitally driven model of the object 102 may be created. The digitally driven model may be a mix between direct measuring and data driven modeling that predicts and analyzes the data to determine how it is interacting with its environment. For example, this digitally driven modeling can use mathematical techniques that include first principle calculations, algorithmic approximation routines and AI approaches to further discover and indicate strong correlations amongst the feature sets. The use of these techniques can be applied at the creation of the first- and second-level primitives referenced or on the higher order features from all sensors in the system. For example, AI can be used to recognize real world objects from shape and orientation of facets rather than or in addition to intensity variables. In some implementations, the shape of the object 102 may be associated with one or more datasets. Example datasets include meta data (e.g., date, time, location of sensor, biometric data of who captured, all primitive one data records for all surface pixels used to define the shape) or a characterization and quantification of the shape (e.g., volume, location in universal coordinates, timeslice of capture).

In some examples, the object 102 may be moving. Consequently, in some examples, a time-series analysis of the combined data set over different instances of time may be performed, e.g., to generate dynamic surface analytics that are indicative of, for example, surface flow, velocity, acceleration, stress and strain on a surface, etc., of the object 102. Therefore, the proposed integrated imaging systems enables the examination of the pixels in a single frame or across frames as clusters of primitives or attributes. As an example, dynamic surface deformations and physics engines may be used to analyze the change in surface motion. In other examples, shapes of the object 102 are predicted, e.g., based on the analysis of variations of the object 102 in a time-series. Some applications include predicting the rate of corrosion or blister growth and predicting motion of the object 102 based on its movement in a tracking application. Other applications of the integrated imaging system 100 include drone detection or object tracking, quality inspection and 3D scanning in an industrial environment (e.g., as illustrated in FIG. 10), wound imaging and early skin cancer detection, 3D facial reconstruction and identification of an individual, autonomous navigation, to name a few.

As mentioned above, the proposed integrated imaging system is upward and downward compatible with any currently available imaging modality and can be developed out of full imaging wafers. For example, by stacking wafers, the proposed integrated imaging system can be manufactured as a small footprint package in a cost-effective manner. Illustratively, a first core level may be an imaging wafer having a plurality (e.g., thousands) of imaging sensors. The imaging sensors may be arranged as a collection of imagers, where each imager includes an SPI sensor and possibly one other sensor. The imaging wafer may be of any size (e.g., a 200 mm or 300 mm wafer) or may be a wafer used in any manufacturing node size. In some implementations, the imaging wafer may contain additional layers disposed on each of the imagers of the imaging sensors, examples of such additional layers being color, multispectral, hyperspectral, Infrared, polarization, lenslets, multiple types of other depth pixels or imagers, etc. An overlying wafer containing integrated wafer-level optics may be stacked or mounted over a top surface of the imaging wafer. The wafer-level optics may use standard lens designs for small elements for magnification. In some implementations, telescopic lenses may be included in the wafer-level optics. Onboard processors may also be provided in the small footprint package. For example, in some implementations, the onboard processors are placed on the imaging wafer between each of the imagers. However, the onboard processors may also be manufactured on a separate wafer (e.g., with multiple level processors) that can be attached to a back surface of the imaging wafer. In some implementations, a single controller processor processes and correlates the data from each imager for effective results image or results data. The local processors act as localized processing on the edge for fast efficient analytics. With shape-based processing (e.g., through the use of the SPI sensor), this architecture provides real-time results on the edge. Furthermore, advanced 3D analytics and AI engines can be programmed at the system level.

Figure 11:
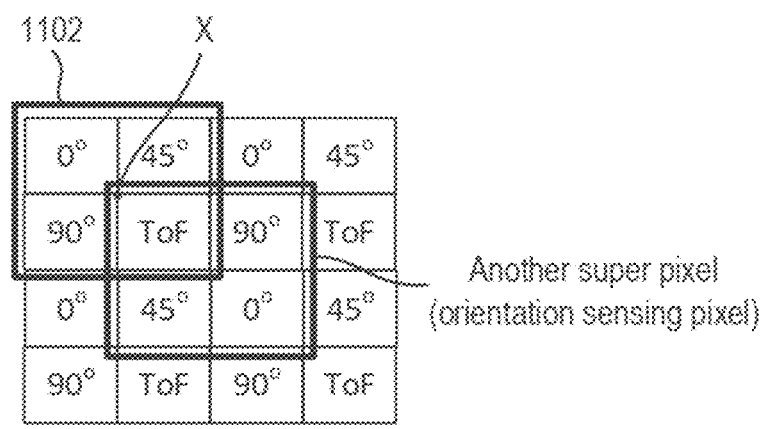
FIG. 11 shows a top-down view of an example super pixel of the integrated imaging system shown in FIG. 1A.

As described above, some examples of integration, the SPI sensor 106-1 and the second sensor 106-2 are integrated by building the sensors 106-1, 106-2 into a single integrated sensor by staggering different types of pixels in the same device. FIG. 11 shows an example super pixel 1102 having three polarization angles and one ToF sensor. The detector pixels below the 0-degree, 45-degree, and 90-degree polarization filters are used for the above-described SPI sensor 106-1, while the ToF sensor is used for the above-described second sensor 106-2.

In summary, when EM radiation 104 reflects off of surfaces, certain characteristics of the EM radiation 104 change as the orientation of surface elements change. By sensing these characteristics, the SPI sensor 106-1 detects the three-dimensional shape of a surface. The SPI sensor 106-1 measures more than the wavelength and intensity of EM radiation 104. Rather, the SPI sensor 106-1 is based on this surface phenomenon, which applies to EM radiation 104 emitted from a surface and is bent as it goes from one medium to another. Thus spatial phase data generated by the SPI sensor 106-1 includes the natural characteristics of EM radiation 104 interacting with a surface from angles of light or angles eminating from the surface. The reconstruction of that information enables the reconstruction of the normal to the surface at each pixel, which may be dynamically analyzed to detect a change in that surface or pixel over time. Integration of the SPI sensor 106-1 along with the second sensor 106-2 is performed to improve the quality of 3D information of the scene.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array), AI processor or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. Data processing may be performed by any and all processing types such as quantum processors, light field, etc. not just conventional computer chips of today. Computer storage medium includes any and all storage approaches be they SSD, optical, quantum based, photonic, biological, etc.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, integrated spatial phase imaging is described.

Example 1 of a first aspect: an integrated imaging system includes a sensor device and one or more processors. The sensor device is configured to generate a first set of data indicative of a first set of attributes of an object and a second set of data indicative of a second set of attributes of the object, the second set of attributes being different from the first set of attributes. The one or more processors are configured to: generate a first set of primitives based on the first set of data; generate a second set of primitives based on the second set of data, wherein each of the first and second sets of primitives includes a respective first-level primitive and a respective second-level primitive; generate a combined data set based on the first set of primitives and the second set of primitives; and determine a plurality of features of the object based on the combined data set.

Example 2: The integrated imaging system of Example 1, wherein the sensor device includes a spatial phase imaging sensor configured to generate the first and second sets of data.

Example 3: The integrated imaging system of Example 1, wherein the sensor device includes: a spatial phase imaging sensor configured to generate the first set of data; and one or more second sensors configured to generate the second set of data.

Example 4: The integrated imaging system of Example 3, wherein the second sensor includes another spatial phase imaging sensor, a Kinect sensor, a light detection and ranging sensor, an infrared sensor, a spectral sensor, an X-Ray sensor, a laser scanner, a monochrome sensor, a color sensor, a shape from motion sensor, a stereo sensor, a depth sensor, a sonar sensor, a radar sensor, a time-of-flight sensor, a plenoptic sensor, an acoustic sensor, a structured light sensor, a rangefinder, a focus sensor, or a combination thereof.

Example 5: The integrated imaging system of Example 3, wherein generating the combined data set based on the first set of primitives and the second set of primitives includes: transforming the second set of primitives to a coordinate system of the spatial phase imaging sensor; pruning occluded and non-projected points from the transformed second set of primitives; generating a smooth surface based on the pruned and transformed second set of primitives; performing a hemisphere correction on the first set of primitives based on the smooth surface; and combining low spatial frequency components from the smooth surface to the corrected first set of primitives.

Example 6: The integrated imaging system of Example 1, wherein the plurality of features includes a three-dimensional model or image of the object, a frequency distribution of electromagnetic radiation emanating from the object, angles of one or more surfaces of the object, surface normal vectors associated with the one or more surfaces of the object, an identification of a material of the object, interior volume features of the object, gradients of the object, or a combination thereof.

Example 7: The integrated imaging system of Example 1, wherein at least one of the first set of attributes or the second set of attributes includes an orientation of electromagnetic radiation emitted by, reflected off, or transmitted through the object.

Example 8: The integrated imaging system of Example 7, wherein the electromagnetic radiation is an incoherent illumination, an active illumination, a passive illumination.

Example 9: The integrated imaging system of Example 7, wherein the electromagnetic radiation encompasses all bands of the electromagnetic spectrum.

Example 10: The integrated imaging system of Example 7, wherein the orientation of electromagnetic radiation includes the orientation of an electric field of the electromagnetic radiation.

Example 11: The integrated imaging system of Example 7, wherein the orientation of electromagnetic radiation includes the orientation of a magnetic field of the electromagnetic radiation.

Example 12: The integrated imaging system of Example 1, wherein the sensor device is disposed on an imaging wafer, and wherein the one or more processors are disposed on a second wafer attached to a back surface of the imaging wafer.

Example 13: The integrated imaging system of Example 1, wherein the sensor device includes an electromagnetic detector including an orientation-sensing pixel sensitive to orientations of electromagnetic radiation emitted by, reflected off, or transmitted through the object, the orientation-sensing pixel including a plurality of regular or irregularly arranged sub-pixels.

Example 14: The integrated imaging system of Example 13, wherein the electromagnetic detector includes a polarizing array configured to be selective to the orientations of the electromagnetic radiation.

Example 15: A method, including: generating, by a sensor device, a first set of data indicative of a first set of attributes of an object and a second set of data indicative of a second set of attributes of the object, the second set of attributes being different from the first set of attributes; generating, by one or more processors, a first set of primitives based on the first set of data; generating, by the one or more processors, a second set of primitives based on the second set of data, wherein each of the first and second sets of primitives includes a respective first-level primitive and a respective second-level primitive; generating, by the one or more processors, a combined data set based on the first set of primitives and the second set of primitives; and determining, by the one or more processors, a plurality of features of the object based on the combined data set.

Example 16: The method of Example 15, wherein determining the plurality of features of the object includes a time-series analysis of the combined data set over different instances of time.

Example 17: The method of Example 16, wherein the plurality of features includes a surface flow, a velocity, an acceleration, a stress on a surface of the object, a strain on a surface of the object, or a combination thereof.

Example 18: The method of Example 17, wherein determining the plurality of features of the object includes an examination of pixels of the object in a single frame or across frames as clusters of primitives or attributes.

Example 19: The method of Example 15, further including training one or more artificial intelligence routines based on the plurality of features of the object.

Example 20: The method of Example 19, wherein the plurality of features includes one or more simple surface normals of the object, surface angles of the object, a polarization image of the object, color and spectral information associated with a shape of the object, angle invariant clusters of the object, slope vectors at a pixel of the object, a pixel surface orientation of the object, shape information of the object, or a combination thereof, and wherein the one or more artificial intelligence routines are configured to learn a lighting, shape, shape texture, color, diffuse material, temperature, or combinations thereof.

Example 21: The method of Example 19, wherein the plurality of features of the object form a synthetic data set, and wherein the one or more artificial intelligence routines are autonomously trained on the synthetic data set.

Example 22: The method of Example 15, wherein the plurality of features includes a three-dimensional distribution of surface normal vectors of the object, and wherein the one or more processors are configured to: determine a relationship among the surface normal vectors that is invariant to an orientation in a physical world frame; and track a shape or motion of the object based on the relationship among the surface normal vectors.

Example 23: The method of Example 22, wherein the relationship among the surface normal vectors includes at least one of: a clustering of similar angle data; a change in a direction of the surface normal vectors across a surface of the object; or a rate of the change in the direction of the surface normal vectors across the surface of the object.

Example 24: The method of Example 15, wherein the first set of primitives, the second set of primitives, and the combined data set are generated in real-time as the object is illuminated by an electromagnetic radiation.

Example 25: An integrated wafer-level sensor, including: a sensor wafer including a plurality of sensor devices; an optics wafer disposed over a first surface of the sensor wafer, the optics wafer including a plurality of focusing elements, each focusing element disposed over a respective one of the plurality of sensor devices; and a controller wafer disposed at a second surface of the sensor wafer, the controller wafer including a plurality of processors, each processor configured to control operation of a respective sensor device and its respective focusing element.

Example 26: The integrated wafer-level sensor of Example 25, wherein the integrated wafer-level sensor is configured to operate as a single integrated imaging system.

Example 27: The integrated wafer-level sensor of Example 25, wherein the integrated wafer-level sensor is configured to operate as a plurality of imaging arrays.

In a second aspect, a non-transitory computer-readable medium stores instructions that are operable when executed by data processing apparatus to perform one or more operations of the first aspect.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. An integrated imaging system, comprising:
a sensor device configured to generate a first set of data indicative of a first set of attributes of an object and a second set of data indicative of a second set of attributes of the object, the second set of attributes being different from the first set of attributes, wherein the sensor device comprises at least one sensor that is sensitive to:
a magnetic vector of electromagnetic (EM) radiation emitted by, reflected off, or transmitted through the object; and
an electric vector of the EM radiation emitted by, reflected off, or transmitted through the object; and
wherein at least one of the first set of attributes or the second set of attributes comprises an orientation of the EM radiation based on an interaction of the EM radiation with the object; and
one or more processors configured to:
generate a first set of primitives based on the first set of data;
generate a second set of primitives based on the second set of data, wherein each of the first and second sets of primitives comprises a respective first-level primitive and a respective second-level primitive;
wherein at least one of the first set of primitives or the second set of primitives are based on the electric field of the EM radiation and the magnetic field of the EM radiation;
generate a combined data set based on the first set of primitives and the second set of primitives, wherein the combined data set includes three-dimensional surface normal vectors associated with the object; and
determine a plurality of features of the object based on the combined data set.

2. The integrated imaging system of claim 1, wherein the sensor device comprises a spatial phase imaging sensor configured to generate the first and second sets of data.

3. The integrated imaging system of claim 1, wherein the sensor device comprises:
a spatial phase imaging sensor configured to generate the first set of data; and
one or more second sensors configured to generate the second set of data.

4. The integrated imaging system of claim 3, wherein the second sensor comprises another spatial phase imaging sensor, a Kinect sensor, a light detection and ranging sensor, an infrared sensor, a spectral sensor, an X-Ray sensor, a laser scanner, a monochrome sensor, a color sensor, a shape from motion sensor, a stereo sensor, a depth sensor, a sonar sensor, a radar sensor, a time-of-flight sensor, a plenoptic sensor, an acoustic sensor, a structured light sensor, a rangefinder, a focus sensor, or a combination thereof.

5. The integrated imaging system of claim 3, wherein generating the combined data set based on the first set of primitives and the second set of primitives comprises:
transforming the second set of primitives to a coordinate system of the spatial phase imaging sensor;
pruning occluded and non-projected points from the transformed second set of primitives;
generating a smooth surface based on the pruned and transformed second set of primitives;
performing a hemisphere correction on the first set of primitives based on the smooth surface; and
combining low spatial frequency components from the smooth surface to the corrected first set of primitives.

6. The integrated imaging system of claim 1, wherein the plurality of features comprises a three-dimensional model or image of the object, a frequency distribution of electromagnetic radiation emanating from the object, angles of one or more surfaces of the object, surface normal vectors associated with the one or more surfaces of the object, an identification of a material of the object, interior volume features of the object, gradients of the object, or a combination thereof.

7. The integrated imaging system of claim 1, wherein the electromagnetic radiation is an incoherent illumination, an active illumination, a passive illumination.

8. The integrated imaging system of claim 1, wherein the electromagnetic radiation encompasses all bands of the electromagnetic spectrum.

9. The integrated imaging system of claim 1, wherein the orientation of electromagnetic radiation comprises the orientation of an electric field of the electromagnetic radiation.

10. The integrated imaging system of claim 1, wherein the orientation of electromagnetic radiation comprises the orientation of a magnetic field of the electromagnetic radiation.

11. The integrated imaging system of claim 1, wherein the sensor device is disposed on an imaging wafer, and wherein the one or more processors are disposed on a second wafer attached to a back surface of the imaging wafer.

12. The integrated imaging system of claim 1, wherein the sensor device comprises an electromagnetic detector comprising an orientation-sensing pixel sensitive to orientations of electromagnetic radiation emitted by, reflected off, or transmitted through the object, the orientation-sensing pixel comprising a plurality of regular or irregularly arranged sub-pixels.

13. The integrated imaging system of claim 12, wherein the electromagnetic detector comprises a polarizing array configured to be selective to the orientations of the electromagnetic radiation.

14. A method, comprising:
generating, by a sensor device, a first set of data indicative of a first set of attributes of an object and a second set of data indicative of a second set of attributes of the object, the second set of attributes being different from the first set of attributes, wherein the sensor device comprises at least one sensor that is sensitive to:
a magnetic vector of electromagnetic (EM) radiation emitted by, reflected off, or transmitted through the object;
an electric vector of the EM radiation emitted by, reflected off, or transmitted through the object;
and wherein at least one of the first set of attributes or the second set of attributes comprises an orientation of the EM radiation based on an interaction of the EM radiation with the object; and
generating, by one or more processors, a first set of primitives based on the first set of data;
generating, by the one or more processors, a second set of primitives based on the second set of data, wherein each of the first and second sets of primitives comprises a respective first-level primitive and a respective second-level primitive;
wherein at least one of the first set of primitives or second sets of primitives are based on the electric field of the EM radiation and the magnetic field of the EM radiation;
generating, by the one or more processors, a combined data set based on the first set of primitives and the second set of primitives, wherein the combined data set includes three-dimensional surface normal vectors associated with the object; and
determining, by the one or more processors, a plurality of features of the object based on the combined data set.

15. The method of claim 14, wherein determining the plurality of features of the object comprises a time-series analysis of the combined data set over different instances of time.

16. The method of claim 15, wherein the plurality of features comprises a surface flow, a velocity, an acceleration, a stress on a surface of the object, a strain on a surface of the object, or a combination thereof.

17. The method of claim 16, wherein determining the plurality of features of the object comprises an examination of pixels of the object in a single frame or across frames as clusters of primitives or attributes.

18. The method of claim 14, further comprising training one or more artificial intelligence routines based on the plurality of features of the object.

19. The method of claim 18, wherein the plurality of features comprises one or more simple surface normals of the object, surface angles of the object, a polarization image of the object, color and spectral information associated with a shape of the object, angle invariant clusters of the object, slope vectors at a pixel of the object, a pixel surface orientation of the object, shape information of the object, or a combination thereof, and wherein the one or more artificial intelligence routines are configured to learn a lighting, shape, shape texture, color, diffuse material, temperature, or combinations thereof of the object based on the plurality of features.

20. The method of claim 18, wherein the plurality of features of the object form a synthetic data set or existing data, and wherein the one or more artificial intelligence routines are autonomously trained on one or more of the synthetic data set or the existing data.

21. The method of claim 14, wherein the one or more processors are configured to:
determine a relationship among the surface normal vectors that is invariant to an orientation in a physical world frame; and
track a shape or motion of the object based on the relationship among the surface normal vectors.

22. The method of claim 21, wherein the relationship among the surface normal vectors comprises at least one of:
a clustering of similar angle data;
a change in a direction of the surface normal vectors across a surface of the object; or
a rate of the change in the direction of the surface normal vectors across the surface of the object.

23. The method of claim 14, wherein the first set of primitives, the second set of primitives, and the combined data set are generated in real-time as the object is illuminated by an electromagnetic radiation.

24. An integrated wafer-level sensor, comprising:
a sensor wafer comprising a plurality of sensor devices, wherein the plurality of sensor devices comprise at least one sensor that is sensitive to:
a magnetic vector of electromagnetic (EM) radiation emitted by, reflected off, or transmitted through an object in a field of view of the sensor;
an electric vector of the EM radiation emitted by, reflected off, or transmitted through the object; and
wherein at least one of a first set of attributes or a second set of attributes comprises an orientation of the EM radiation based on an interaction of the EM radiation with the object; and;
an optics wafer disposed over a first surface of the sensor wafer, the optics wafer comprising a plurality of focusing elements, each focusing element disposed over a respective one of the plurality of sensor devices; and
a controller wafer disposed at a second surface of the sensor wafer, the controller wafer comprising a plurality of processors, each processor configured to control operation of a respective sensor device and its respective focusing element wherein the plurality of processors comprises at least one processor that is operable to generate a combined data set from the first set of attributes and the second set of attributes, wherein the combined data set includes three-dimensional surface normal vectors associated with the object.

25. The integrated wafer-level sensor of claim 24, wherein the integrated wafer-level sensor is configured to operate as a single integrated imaging system.

26. The integrated wafer-level sensor of claim 24, wherein the integrated wafer-level sensor is configured to operate as a plurality of imaging arrays.

\* \* \* \* \*

UNITED STATES PATENT AND TRADEMARK OFFICE
CERTIFICATE OF CORRECTION

| | |
|---|---|
| PATENT NO. | : 12,032,278 B2 |
| APPLICATION NO. | : 17/395627 |
| DATED | : July 9, 2024 |
| INVENTOR(S) | : Barbour et al. |

It is certified that error appears in the above-identified patent and that said Letters Patent is hereby corrected as shown below:

In the Specification

Column 11, Line 43 Delete "10" and insert -- i0 -- therefor

Column 16, Line 66 Delete "do," and insert -- d0, -- therefor

Column 19, Line 1 Delete "0 or (0+T)." and insert -- $\theta$ or $(\theta+ \pi)$. -- therefor Column 19, Line 6 Delete "610," and insert -- 710, -- therefor Column 21, Line 19 Delete "eminating" and insert -- emanating -- therefor In the Claims Column 27, Line 30 In Claim 14, after "object;" insert -- and --

Column 27, Line 31 In Claim 14, before "wherein" delete "and"

Column 28, Line 50 In Claim 24, delete "and;" and insert -- and -- therefor

Signed and Sealed this
Seventeenth Day of September, 2024

Katherine Kelly Vidal
*Director of the United States Patent and Trademark Office*